(12) United States Patent
McCarthy et al.

(10) Patent No.: US 9,137,106 B2
(45) Date of Patent: Sep. 15, 2015

(54) SYSTEMS AND METHODS FOR PRIVATE CLOUD COMPUTING

(71) Applicant: State Street Corporation, Boston, MA (US)

(72) Inventors: Christopher McCarthy, Norwell, MA (US); Kevin Sullivan, Cohasset, MA (US); Rejith Krishnan, Foxboro, MA (US)

(73) Assignee: State Street Corporation, Boston, MA (US)

( * ) Notice: Subject to any disclaimer, the term of this patent is extended or adjusted under 35 U.S.C. 154(b) by 262 days.

(21) Appl. No.: 13/921,856

(22) Filed: Jun. 19, 2013

(65) Prior Publication Data

US 2013/0282798 A1   Oct. 24, 2013

Related U.S. Application Data

(63) Continuation of application No. 13/180,487, filed on Jul. 11, 2011, now Pat. No. 8,495,611.

(60) Provisional application No. 61/363,092, filed on Jul. 9, 2010.

(51) Int. Cl.
| | |
|---|---|
| *G06F 15/16* | (2006.01) |
| *G06F 15/177* | (2006.01) |
| *G06F 15/173* | (2006.01) |
| *G06F 9/44* | (2006.01) |
| *G06F 9/45* | (2006.01) |
| *G06F 1/00* | (2006.01) |
| *H04L 12/24* | (2006.01) |
| *G06F 9/50* | (2006.01) |

(52) U.S. Cl.
CPC .......... *H04L 41/0806* (2013.01); *G06F 9/5072* (2013.01)

(58) Field of Classification Search
CPC ....... G06F 9/455; G06F 9/505; G06F 9/5044; G06F 9/5072; G06F 9/5094
See application file for complete search history.

(56) References Cited

U.S. PATENT DOCUMENTS

| 7,596,620 B1 | 9/2009 | Colton et al. | |
|---|---|---|---|
| 8,495,611 B2 | 7/2013 | McCarthy et al. | |
| 8,516,293 B2 * | 8/2013 | Carter et al. | 713/501 |
| 8,656,018 B1 * | 2/2014 | Keagy et al. | 709/226 |
| 2004/0268293 A1 | 12/2004 | Woodgeard | |
| 2009/0276771 A1 | 11/2009 | Nickolov et al. | |
| 2009/0300210 A1 * | 12/2009 | Ferris | 709/235 |

(Continued)

OTHER PUBLICATIONS

Sudip Chahal et al., An Enterprise Private Cloud Architecture and Implementation Road Map, Jun. 2010, [Retrieved on Apr. 14, 2015]. Retrieved from the internet: <URL: http://www.intel.com/content/dam/doc/guide/intel-it-enterprise-cloud-architecture-roadmap-paper.pdf> 12 Pages (1-12).*

(Continued)

*Primary Examiner* — Don Wong
*Assistant Examiner* — Anibal Rivera
(74) *Attorney, Agent, or Firm* — Wilmer Cutler Pickering Hale and Dorr LLP

(57) ABSTRACT

A system and method are disclosed for private cloud computing and for the development and deployment of cloud applications in the private cloud. The private cloud computing system and method of the present invention include as components at least a cloud controller, a cloud stack, Service Registry, and a cloud application builder.

51 Claims, 28 Drawing Sheets

(56) References Cited

U.S. PATENT DOCUMENTS

| | | | |
|---|---|---|---|
| 2010/0042670 A1 | 2/2010 | Kamalakantha et al. | |
| 2010/0061250 A1 | 3/2010 | Nugent | |
| 2010/0064033 A1 | 3/2010 | Travostino et al. | |
| 2010/0083222 A1 | 4/2010 | Maximilien et al. | |
| 2010/0125664 A1* | 5/2010 | Hadar et al. | 709/224 |
| 2010/0223385 A1* | 9/2010 | Gulley et al. | 709/226 |
| 2010/0235526 A1* | 9/2010 | Carter et al. | 709/229 |
| 2010/0235539 A1* | 9/2010 | Carter et al. | 709/238 |
| 2010/0235829 A1 | 9/2010 | Shukla et al. | |
| 2010/0287263 A1* | 11/2010 | Liu et al. | 709/221 |
| 2010/0306765 A1* | 12/2010 | DeHaan | 709/225 |
| 2010/0318609 A1* | 12/2010 | Lahiri et al. | 709/205 |
| 2010/0318649 A1 | 12/2010 | Moore et al. | |
| 2010/0332629 A1 | 12/2010 | Cotugno et al. | |
| 2011/0055396 A1* | 3/2011 | DeHaan | 709/226 |
| 2011/0060832 A1* | 3/2011 | Govil et al. | 709/225 |
| 2011/0072487 A1* | 3/2011 | Hadar et al. | 709/202 |
| 2011/0138050 A1 | 6/2011 | Dawson et al. | |
| 2011/0153727 A1 | 6/2011 | Li | |
| 2011/0161952 A1 | 6/2011 | Poddar et al. | |

OTHER PUBLICATIONS

Christina Vecchiola et al., High-Performance Cloud Computing: A View of Scientific Applications, IEEE 2009, DOI 10.1109/I-SPAN. 2009 [Retrievedon Sep. 20, 2012]. Retrieved from the internet: <URL: http://ieeexplore.ieee.org/stamp/stamp.jsp?tp=&arnumber=5381983> 13 Pages (4-16).

International Search Report and Written Opinion mailed on Nov. 22, 2011 for International Application No. PCT/US11/43604 filed Jul. 11, 2011(6 pages).

Liang Zhao et al., Evaluating Cloud Platform Architecture with the CARE framework, Asia Pacific Software Engineering Conference, 2010 IEEE [Retrieved on Sep. 20, 2012]. Retrieved from the internet: <URL:http://ieeexplore.ieee.org/stamp/stamp.jsp?tp=&arnumber=5693181> 10 Pages (60-69).

* cited by examiner

Add New Application Profile

Configuration ▽ | Info ▽ | Action ▽

| | | | |
|---|---|---|---|
| Status: | DRAFT | Effective Date: | 06/10/2011  10:51 ▽ |
| Name: | | Expire Date: | ▽ |
| App Code: | 0.0.0 | Cluster Name: | |
| Version: | | Context: | |
| Zone Env.: | ▽ | Request Pattern: | ▽ |
| Zone Code: | ▽ | Workflow: | Normal |
| Is Backout: | No | App Image: | ... |

[ Add New ]  [ Close ]  [ Save ]

| CLD-NA |
| GDC-DC |
| GDC-DEV |
| GDC-PROD |
| GDC-SYS |
| GDC-UAT |
| IGB-DC |
| IGB-DEV |
| IGB-PROD |
| IGB-SYS |
| IGB-UAT |
| GDC-DC |

Image Browser

| | Name | Version | Description | Type | Checksum | File Name | App Code | Build Date |
|---|---|---|---|---|---|---|---|---|
| 1802 | MyHelloWorld.war | 10.56... | MyHelloWorld 01 | WAR | 136 | MyHelloWorld.war | OSA_ABC | Nov 30, 2010 06:52:59 |
| | MyHelloWorld.war | 10.56... | MyHelloWorld 01 | WAR | 136 | MyHelloWorld.war | OSA_ABC | Nov 30, 2010 05:09:48 |

|◁ ◁◁ |Page [1] of 1 | ▷▷ ▷|      Displaying 1 - 2 of 2

[Select Image] [Cancel]

| # | RULE | SEVERITY | ALERT |
|---|------|----------|-------|
| 1 | EFFECTIVE DATE IS IN THE PAST | WARN | APP WILL BE DEPLOYED IMMEDIATELY AFTER ALL APPROVALS ARE IN PLACE WHICH COULD RESULT IN APP BEING DOWN DURING BUSINESS HOURS |
| 2 | EFFECTIVE DATE DURING BUSINESS HOURS | FATAL | APP WILL BE DEPLOYED DURING BUSINESS HOURS RESULTING IN DOWNTIME DURING BUSINESS |
| 3 | EFFECTIVE DATE DURING MORATORIUM | FATAL | APP WILL BE DEPLOYED DURING MORATORIUM AND HENCE REQUIRE ADDITIONAL APPROVALS |
| 4 | EFFECTIVE DATE IS TWO WEEKS AWAY | WARN | APP WILL NOT BE DEPLOYED WITHIN TWO WEEKS |
| 5 | APP IMAGE WAS DECLINED BEFORE DUE TO BUGS | WARN | APP IMAGE MIGHT HAVE BUGS. THE IMAGE ASSOCIATED WITH THE APP WAS DECLINED IN THE PAST DUE TO BUGS |
| 6 | APP IMAGE WAS NEVER DEPLOYED IN UA | FATAL | APP IS BEING DEPLOYED WITH NO TESTING IN UA ENVIRONMENT |
| 7 | APP IMAGE WAS ONLY DEPLOYED IN UA FOR N HOURS (WHERE N < 24) | WARN | APP IS BEING DEPLOYED WITHOUT SUFFICIENT TESTING |
| 8 | APP IMAGE SHOULD CONTAIN ONLY AUTHORIZED THIRD-PARTY LIBRARIES | FATAL | UNAUTHORIZED THIRD-PARTY LIBRARY FOUND IN IMAGE ASSOCIATED WITH THE APP |
| 9 | APP IMAGE SHOULD NOT CONTAIN ANY LIBRARIES THAT ARE PART OF THE STACK | FATAL | DUPLICATE LIBRARY FOUND IN IMAGE ASSOCIATED WITH THE APP |
| 10 | APP IMAGE BUILD SHOULD NOT HAVE SECURITY VIOLATIONS DURING STATIC ANALYSIS | FATAL | SECURITY VIOLATIONS FOUND IN IMAGE ASSOCIATED WITH THE APP |

SYSTEMS AND METHODS FOR PRIVATE CLOUD COMPUTING

RELATED APPLICATIONS

The present application is a continuation of U.S. patent application Ser. No. 13/180,487 filed on Jul. 11, 2011, entitled System and Methods for Private Cloud Computing, and claims the benefit of U.S. Provisional Application 61/363,092 filed on Jul. 9, 2010, entitled Self-Organizing Cloud Computing, each of which is incorporated in its entirety by reference herein.

FIELD OF THE INVENTION

The present invention relates to computer-based systems and methods for cloud computing, and more specifically to computer-based systems and methods for private cloud computing and for cloud application development and deployment within a private cloud.

BACKGROUND OF THE INVENTION

Generally, cloud computing refers to the use and access of multiple server-based computational resources using a digital network, such as the Internet. Cloud system users access the web server services of the cloud using client devices, such as a desktop computer, laptop computer, tablet computer, smartphone, personal digital assistant (PDA), or similar type device (hereinafter collectively referred to as a "client device" or "client devices").

In cloud computing, applications are provided and managed by a cloud server and data is stored remotely in a cloud database. Typically, cloud system users do not download and install applications that exist in the cloud on their own computing device because processing and storage is maintained by the cloud server and cloud database, respectively.

Typically, online services are provided by a cloud provider or private organization. This obviates the need for cloud system users to install application software on their own separate client devices. As such, cloud computing differs from the classic client-server model by providing applications on a cloud server that are executed and managed by a client service with no installed client version of the application being required on the client device. The centralization of cloud services gives a cloud service provider control over versions of the browse-based applications provided to clients. This also removes the need for version upgrades of applications on individual client devices.

In operation, the cloud system user will log onto a public or private cloud. Computing is then carried out on a client/server basis using web browser protocols. The cloud provides server-based applications and all data services to the cloud system user with the results then being displayed on the client device. As such, the cloud system user will have access to desired applications running remotely in a database which displays the work being done using the cloud application on the client device.

Cloud database storage allocated client devices is used to make applications appear on the client device display. However, all computations and changes are recorded by the cloud server, and files that are created and altered are permanently stored in the cloud database storage.

Cloud computing, when implemented, includes provisioning of dynamically scalable and virtualized resources. This may be carried out by cloud providers without cloud system users' knowledge of the physical location and configuration of the system that delivers the requested services. As such, cloud computing infrastructures consist of services delivered through shared data centers. However, from the client side, the cloud appears as a single point of access.

A generic cloud architecture includes an architecture of hardware and software systems involved in the delivery of the cloud computing services. Two significant components of the cloud computing architecture are the "front-end" and "back-end." The front-end is what is seen by the cloud system user at his/her client device. This would include the client device application used to access the cloud via the user interface, such as a web browser. The back end of the cloud computing architecture is the cloud itself consisting of various computers, servers, and data storage devices of which the cloud system user has no knowledge.

The shared services within a typical cloud computing environment are shown in FIG. 1 generally at 100. Client 102 is the client device with its internal software that relies on cloud computing for application delivery through web services. Cloud application 104 is cloud application services also referred to as "Software as a Service (SaaS)." This is the delivery of software over the Internet that eliminates the need to install and run an application on the cloud system user's computing device. Since the applications are cloud applications, maintenance and support of these applications is greatly simplified.

Cloud platform 106 is cloud platform services also referred to as "Platform as a Service (PaaS)." PaaS is the delivery of a computing platform and/or solution stack as a service that uses the cloud infrastructure and cloud applications. This facilitates the deployment of applications from the cloud.

Cloud infrastructure 108 is cloud infrastructure services also referred to as "Infrastructure as a Service (IaaS)." IaaS is the delivery of computer infrastructure as a service typically in the form of platform virtualization. Cloud infrastructure services may be in the form of data centers operating virtual machines that run on physical machines.

Server 110 refers to the server layer of the cloud. This includes computer hardware and software for delivery of cloud services to client 102.

As previously stated, the cloud may be a public or private cloud. There are also other cloud configurations that may involve elements of both. Some of the well known cloud types will now be briefly discussed.

A "public cloud" is a cloud in which resources are dynamically provisioned over the Internet using web applications and services from a third-party provider.

A "community cloud" is one that is established where several organizations have similar requirements and seek to share infrastructure to realize the benefits of cloud computing.

A "hybrid cloud" is one that recognizes the need of companies to deliver services in a traditional way to some in-house operating methods and provide technology to manage the complexity in managing the performance, security and privacy concerns that result from the fixed delivery methods of the company. A hybrid cloud uses a combination of public and private storage clouds.

A "combined cloud" is one in which two clouds are joined together. In such a configuration, there will be multiple internal and/or external cloud providers.

A "private cloud" is essentially the emulation of a public cloud operating on a private network. Through virtualization, a private cloud gives an enterprise the ability to host applications on virtual machines enterprise-wide. This provides benefits of shared hardware costs, better service recovery, and the ability to scale up or scale down depending on demand.

However, there is a need in computer-based private cloud systems for implementation of better systems and methods for cloud computing and cloud application development and deployment on an enterprise-wide basis. The system and method of the present invention solves these needs.

SUMMARY OF THE INVENTION

The present invention is a computer-based system and method for cloud computing and cloud application development and deployment in a private cloud within an enterprise. Further, the present invention is directed to computer-based systems and methods for private cloud computing that allow the cloud infrastructure to adapt or respond automatically to changes caused by the deployment and use of cloud applications developed for the private cloud system. The private cloud computing system and method of the present invention may be implemented in the higher-level layers, such as the application and services layers that may be incorporated as part of application layer 104 shown in FIG. 1.

The private cloud computing system and method of the present invention preferably includes a Cloud Controller, Cloud Stack, Service Registry, and Cloud Application Builder. The Cloud Controller provides the intelligence for the private cloud. The Cloud Controller includes a rules engine that is used to analyze information collected and stored in the cloud database. This database stores cloud application binaries, as well as monitoring information. Therefore, rather than the cloud applications being stored in a file system, as is typical, the computer-based private cloud system of the present invention stores cloud applications in a database so that they may be consistently maintained across the cloud in an easy efficient manner.

The Cloud Stack includes the operating software for the cloud. For example, the Cloud Stack may include the operating system software, virtual machine software, web server software, application server software, network security software, web access management software, database driver software, application builder runtime software, and third-party libraries.

The Service Registry contains a register of web services for at least the cloud applications deployed in the private cloud. The web services are searchable by a number of different methods so that developers can view the web services and their detailed information for possible reuse with cloud applications they are developing for deployment in the private cloud.

The Cloud Application Builder provides the means for developers to build applications that are deployed in the private cloud using Cloud Controller. The Cloud Application Builder preferably includes tools to create the components of a cloud application. These components preferably include a web service, a user interface, and jobs for each cloud application to be deployed in the private cloud. As such, the cloud application building tools include, but are not limited to, tools to develop the web services, tools for developing a user interface and registering the web services in the Service Registry so the level of access to cloud applications is controlled, and tools to develop jobs. Using these tools, each cloud application that is developed and deployed will include a user interface for managing foreground tasks, data storage, and background tasks; however, it is understood that more or less than these tools may be used and it will still be within the scope of the present invention.

With regard to building cloud applications, preferably, there are two distinct parts. The first will be the development time to build the cloud application and the second will be the cloud application framework. The development time will involve the use of the Cloud Application Builder to build an application according to the cloud application framework. The cloud application framework along with the resulting cloud application components are deployed in the private cloud.

The system and method of the present invention includes enterprise Security Foundation ("eSF") software that manages the user roles that authorize cloud application access. Accordingly, through eSF, access security is provided to the private cloud of the present invention.

According to the system and method of the present invention, the cloud infrastructure resources are managed by load balancing incoming requests from client devices to use cloud applications and web services by routing these requests to the various web servers and application servers in the private cloud.

Inside the private cloud of the present invention, there also can be the creation of business rules that relate to web services for cloud applications. These provide greater flexibility, management, and control of cloud applications that are developed and deployed in the private cloud.

The private cloud computing system and method of the present invention supports external services. Accordingly, provisioning services for the cloud database may be accomplished using a self-service application for access and control of such external services.

The private cloud computing system and method of the present invention contemplates cloud monitoring services to analyze the usage data in log files and health records associated with the cloud applications running in the private cloud. The results of the analysis are used to scale up or scale down the cloud infrastructure, control alert processes, and facilitate capacity planning The computer-based private cloud computing system and method of the present invention provides for the development and deployment of cloud applications and web services within an enterprise.

The computer-based private cloud computing system and method of the present invention also may be implemented using a Cloud Controller, Cloud Stack, Service Registry, and a Cloud Application Builder. In carrying out this implementation, the Cloud Application Builder builds the cloud application according to the cloud application framework. Once the cloud application is built, the Cloud Controller with the Cloud Stack and Service Registry is used to deploy the cloud application in the private cloud.

The computer-based private cloud computing system and method of the present invention further provides a PaaS through the Cloud Stack to extend the IaaS by anticipating enterprise system needs, which assists in standardizing the cloud application development and deployment process for the enterprise.

The computer-based private cloud computing system and method of the present invention will be described in greater detail in the remainder of the specification referring to the drawings.

BRIEF DESCRIPTION OF THE DRAWINGS

FIGS. 15-22 show representative screen displays for creating a cloud application profile and changing the status of the cloud application from DRAFT to PUBLISHED.

FIG. 23B shows a representative list of Auto-Audit rules that are checked when a cloud application profile status is changed.

FIG. 24 shows a representative display screen of a Dashboard according to the computer-based private cloud system of the present invention.

DETAILED DESCRIPTION OF THE PRESENT INVENTION

Figure 1:
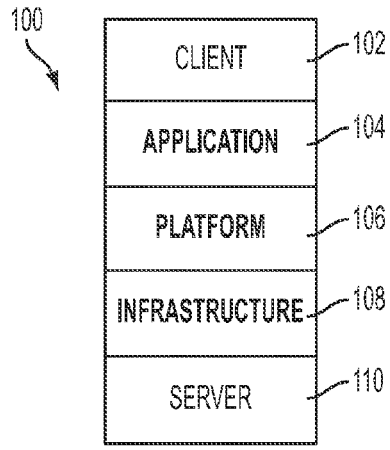
FIG. 1 shows a representative drawing of a layered structure within which services may be shared in a cloud environment.

The present invention is directed to a computer-based system and method for cloud computing and cloud application development and deployment in a private cloud within an enterprise. The present invention is also directed to computer-based systems and methods for private cloud computing in which the cloud infrastructure adapts or responds automatically or substantially automatically to changes caused by the deployment and use of cloud applications developed for the private cloud system. The private cloud computing systems and methods of the present invention are embodied in the higher-level layers, such as the application and services layers that may be incorporated as part of application layer 104 shown in FIG. 1.

Referring to FIG. 2, generally at 200, a representative diagram of the physical structure of the computer-based private cloud computing system of the present invention is shown. In FIG. 2, the cloud cluster and router that form the cloud application server are shown at 202. This cluster shows four server computers forming the cloud application server. As such, any one may be provisioned to handle a request for a cloud application or web services because of the load balancing features of the private cloud of the present invention through provisioning services. However, the cluster may include more or less than four server computers and still be within the scope of the present invention.

External cloud services 204 are connected to cloud application server 202. The external cloud services that are shown include cloakware server 206 that are used to provide network security to the cloud. External cloud services 204 also include messaging server 208 for controlling internal and external messaging associated with the private cloud of the present invention.

External cloud services 204 include file transfer services 210. The services handled by file transfer services 210 include, but are not limited to, client device—cloud, cloud—external system, and intra-cloud file transfers. It is within the scope of the present invention that these files transfers may be encrypted for security purposes.

The last server shown in external cloud services 204 is e-mail server 212. This server is for sending e-mail messages to, and receiving and processing e-mail messages from, client devices. More specifically, the email messages contemplated to be handled by this server include e-mail messages from the private cloud to external systems to inform, for example, of alert conditions or service level objective ("SLO") violations within the private cloud.

Cloud application server 202 connects to application database 214. Preferably, this database stores cloud application data, which includes, for example, application transaction data, reports, and warehouse data.

Web server 216 connects to cloud application server 202 and is disposed between client device 222 and cloud application server 202. Web server 216 operates conventionally to provide content to client devices and processes requests from client devices directed to cloud application server 202. Web server 216 also connects to SiteMinder server 218. Preferably, SiteMinder server 218 provides web access management for web server 216 in the form of authentication services.

Load balancer 220 disposed between client device 222 and web server 216 provides provisioning services for balancing the distribution of cloud applications running in the cloud among the cloud infrastructure. More particularly, load balancer 220 load balances incoming HTTP requests among a number of web servers of which only one is shown in FIG. 2B.

Figure 2A:
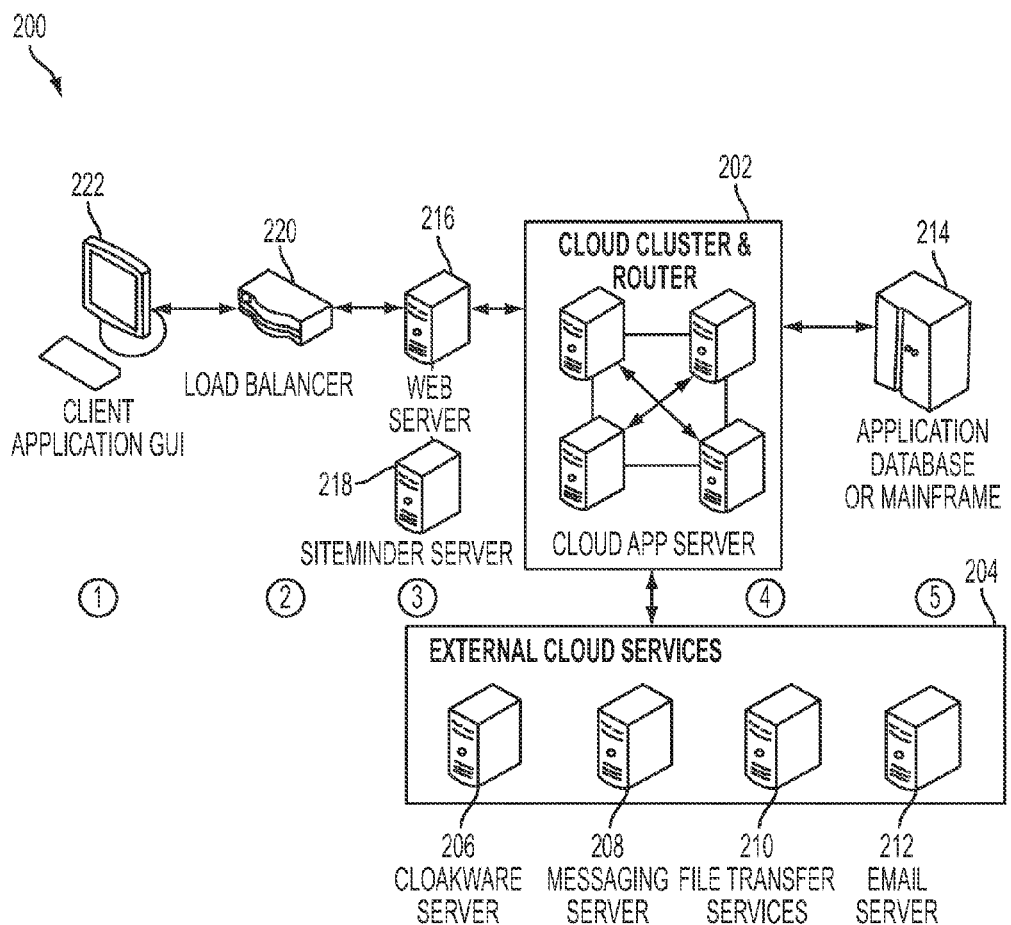
FIG. 2A shows a representative diagram of the physical structure of the computer-based private cloud computing system of the present invention.
Figure 2B:
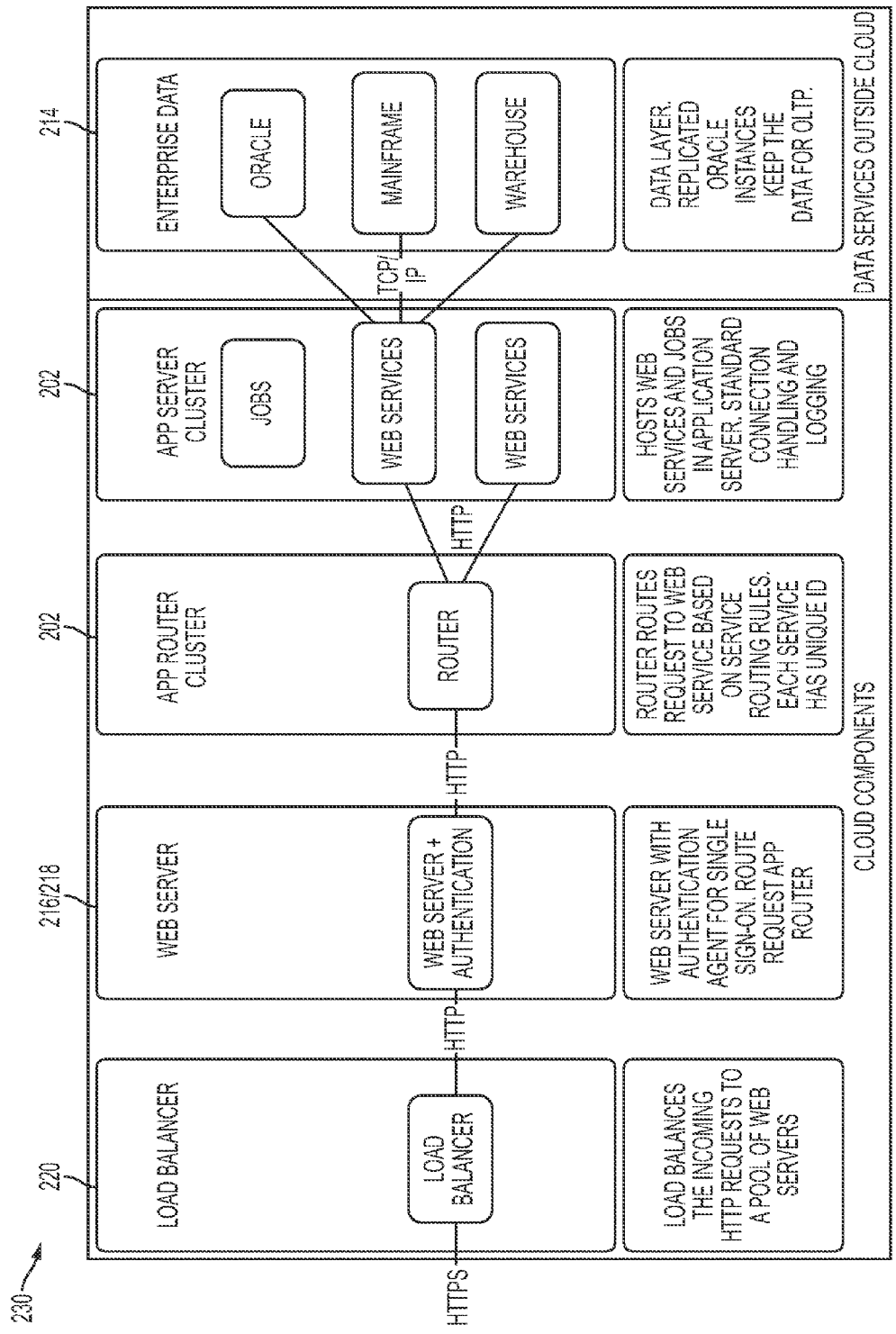
FIG. 2B shows a representative diagram of a logical structure of the computer-based private cloud computing system of the present invention shown in FIG. 2A.

Referring to FIG. 2B, generally at 230, a representative diagram of a logical structure of the computer-based private cloud computing system of the present invention shown in FIG. 2A is shown. Load balancer 220 balances the incoming HTTP requests to a pool of web servers and scales the cloud infrastructure, such as the web servers, up and down to meet the traffic needs. Web server 216/218 performs the functions of a web server and an authentication agent on a single sign-on basis.

The web server routes requests to the application router. The application router is in the form of a cluster of routers that are part of application server 202. The application router route requests to web services in the cloud application server cluster, which is also part of cloud application server 202. Each service is identified by a unique ID.

The application server cluster hosts web services and receives the requests for such services from the application router cluster. The application server cluster also contains jobs. The jobs are batch jobs that are part of the cloud application that reside in the application server cluster.

The web services in the application server cluster connect to application database 214 that includes enterprise data. The application database resides outside the private cloud. The enterprise data includes online transaction processing ("OLTP") and warehouse data that are stored separately. Preferably, replicated instances, which are shown as Oracle instances, keep the data for the OLTP.

Figure 3:
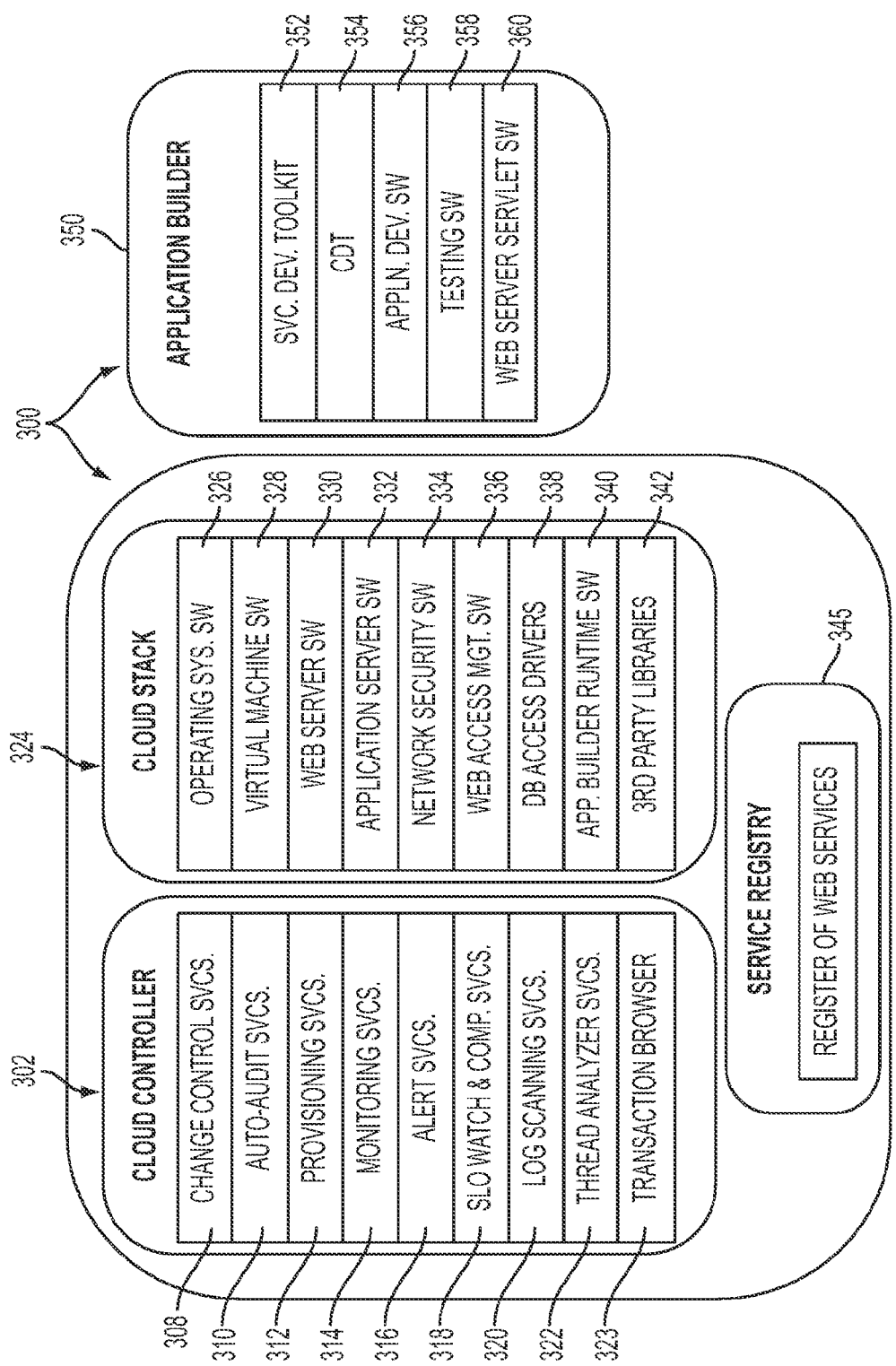
FIG. 3 shows a representative drawing of the cloud components of the computer-based private cloud computing system of the present invention.

Referring to FIG. 3, generally at 300, the components of the computer-based private cloud computing system of the present invention are shown. These components will now be discussed.

The main components of the computer-based private cloud computing system of the present invention include Cloud Controller 302, Cloud Stack 324, Service Registry 345, and Cloud Application Builder 350. As stated, Cloud Controller 302 provides intelligence to the computer-based private cloud computing system of the present invention. The general functions of Cloud Controller 302 are to handle the deployment workflow, set the time and date for cloud application deployment, scale up and scale down platform needs depending on the cloud applications that are to be run, set the time and date for checking the physical and virtual machines, set the time and date for scanning the cloud application logs, set the time and date for monitoring cloud application transactions, and send alerts when errors occur within the private cloud. The deployment workflow will be discussed in greater detail subsequently with respect to FIGS. 27-32.

Change Control services 308 of Cloud Controller 302 are associated with cloud application setup. Change Control services 308 accept bundled binaries created for cloud applications, and permit an authorized system user to create and update a cloud application profile and to browse information about a particular cloud application. The creation of a cloud application profile is for a cloud application that has already been deployed in the private cloud and specifies the appropriate cloud application that is to be run.

Change Control services 308 permit an authorized user to copy the description of an existing profile without the identification fields so that it may be used to describe the new cloud application. Change Control services 308 also permit authorized users to browse existing cloud application profiles and review the information they contain. Further, Change Control services 308 permits authorized users to modify an existing application profile including associated application binaries.

Change Control services 308 permit an authorized user to change the status of an application profile. For example, using this capability, the authorized user could change the status of a cloud application from "DRAFT" to "PUBLISHED." It is recognized, however, other status changes can be made and still be within the scope of the present invention.

Change Control services 308 enable an authorized system user to browse the application status log for cloud applications to review the current and previous statuses for cloud applications. Change Control services 308 also enable authorized system users to browse properties associated with cloud applications and edit those properties.

The features of Change Control services 308 just described are preferable features only. It is contemplated that Change Control services 308 may have more or less of the features described and still be within the scope of the present invention.

Again referring to Cloud Controller 302, Auto-Audit rules are shown at 310. Auto-Audit rules 310 are directed to specific rules that are checked when a cloud application profile status is changed. Auto-Audit rules 310 are configured for the system and typically only the cloud manager can change these rules. Audit-Audit rules 310, preferably, include a set of rules that are applied to every change made to a cloud application profile. Alerts are generated for every Auto-Audit rule that fails. Auto-Audit rules 310 are discussed in more detail with respect to FIGS. 23A and 23B.

Cloud Controller 302 shows Provisioning services at 312. Provisioning services 312 are responsible for executing the deployment related commands issued by the rules engine of the Cloud Controller. Provisioning services 312 will automatically create, shut down, and restart cloud application instances, in which an instance is a single copy of a running application. Provisioning services 312 interact with the platform infrastructure to carry out provisioning. In operation, prior to running a cloud application, Provisioning services 312 will determine the assets needed to run the cloud application and provision the infrastructure accordingly.

The features of Provisioning services 312 just described are preferable features only. It is contemplated that Provisioning services 312 may have more or less of the features described and still be within the scope of the present invention.

Cloud controller 302 shows Monitoring services at 314. Monitoring services 314 capture the information with regard to at least the operational performance of various cloud applications, and the user interface, through the Application Control Panel and Dashboard, make the captured information visible to the system user on his/her client device. Further, the information may be made visible by zone. A zone is created by an authorized user and for purposes of the present invention a zone is defined as a predetermined group of computers. Such computers could be grouped regionally, by divisions of an enterprise or other type of grouping. As such, zones, for example, are a means to segregate and distinguish segments of a cloud for the isolation of environments like deployment, system testing, system user acceptance testing and production; identifying different physical locations and data centers; and enabling quick disaster relief.

Monitoring services 314 also permit authorized users to browse cloud server configurations by zone in a detailed format and browse a list of transactions that show how cloud applications are being used by zone or other user-defined criteria. Further, Monitoring services 314 permit authorized users to view the activity logs that show what particular cloud users have been doing with respect to the private cloud. Authorized users can also view a graphical depiction of data on physical and virtual machines with respect to the cloud and data on SLO violations. Monitoring services 314 permit authorized users to browse information relating to cloud applications that are stored in the private cloud, browse information relating to currently active cloud applications, and browse historical data with respect to cloud applications. Yet further, Monitoring services 314 permit authorized users to set and update SLO thresholds, review SLO statistics, and take actions based on how errors are occurring in cloud applications.

The features of Monitoring services 314 just described are preferable features only. It is contemplated that Monitoring services 314 may have more or less of the features described and still be within the scope of the present invention.

Alert services 316 of Cloud Controller 302 are generated to indicate a status change in a cloud application in the development and deployment process. Alerts generated by Alert services 316 are associated with Auto-Audit rules. Alerts are classified as "INFO," "WARN," "ERROR," and "FATAL" alerts. In the development of cloud applications, the developer of the cloud application and approvers (cloud managers) can view alerts associated with every change in a cloud application profile status. In the deployment process, all alerts require approval by a cloud manager. However, it is understood that the cloud manager may include one or more levels of approvers and it will still be within the scope of the present invention.

The cloud manager may accept or decline an alert after review. If the cloud manager chooses to accept the alert, the cloud application will move forward. However, if the cloud manager declines an alert, it will move the cloud application backwards by setting the status of the cloud application profile to DRAFT and the reason will be "rejected."

Alert services 316 permit authorized users to configure profile change alerts for cloud applications by zone. Alerts may be sent out by Alert services 316, for example, when a cloud application scales up, when a predetermined number of health checks fail in a predetermined amount of time, or when SLO violations go above an average. Alerts may be generated manually or automatically sent out under predetermined conditions, for example by email. Alerts with respect to Auto-Audit rules will be discussed in greater detail subsequently with regard to FIGS. 23A, 23B, and 32.

The features of Alert services 316 just described are preferable features only. It is contemplated that Alert services 316 may have more or less of the features described and still be within the scope of the present invention.

SLO watch and compliance services 318 of Cloud Controller 302 permit authorized system users to view a summary of all SLO violations by individual cloud applications or by zone. SLO watch and compliance services 318 also permit authorized system users to view individual violations for a summary value. Further, SLO watching and compliance services 318 allow authorized system users to view a log of individual transaction violations. Yet further, SLO watching and compliance services 318 permit authorized users to filter violations by user, zone, cloud application, web service, or other predetermined criteria.

The features of SLO watching and compliance services 318 just described are preferable features only. It is contemplated that SLO watching and compliance services 318 may have more or less of the features described and still be within the scope of the present invention.

Log Scanning services 320 of Cloud Controller 302 permit an authorized system user to view the activity relating to a cloud application, an instance, a hypervisor in control of a virtual machine, or other cloud elements. Using the Log Scanning services, an authorized system user can request an on-demand log scan of any cloud application or component. Further, using Log Scanning Services 320, an authorized system user can view the activities relating to a deployed cloud application.

Thread Analyzer services 322 permit authorized system users to view transactions that take place within the private cloud with respect to particular nodes that relate to a cloud application that is running Transaction Browser 323 permits authorized system users to filter transactions by user, zone, cloud application, web service, or other predetermined criteria. Transaction Browser 323 allows authorized system users to group transactions together to understand macro behavior, view time statistics by cloud application and zone, and compare response time statistics for a current cloud application and zone with typical time statistics for cloud applications and zones.

The features of Thread Analyzer services 322 and Transaction Browser 323 just described are preferable features only. It is contemplated that Thread Analyzer services 322 and Transaction Browser 323 may have more or less of the features described and still be within the scope of the present invention.

Cloud Stack 324 includes the software stack for the private cloud. Cloud Stack 324 includes operating system software 326, which is preferably Linux software. Further, Cloud Stack 324 includes virtual machine operating software 328 for use by the virtual machines running in the cloud that are managed by hypervisors. Preferably this software is Java Development Kit ("JDK") software from Sun Microsystems, Inc/Oracle, Inc.

Cloud Stack 324 includes web server software 330, which preferably is Apache Web server software from the Apache Software Foundation. Cloud Stack 324 also includes application server software 332. Preferably, the application server software is JBoss software that includes a Tomcat servlet container. The JBoss software is from Red Hat, Inc. and the Tomcat servlet container software is from the Apache Software Foundation.

Cloud Stack 324 includes network security software 334, which preferably is Cloakware software from Irdeto B.V. The next software in Cloud Stack 324 is web access management software 336, which is preferably SiteMinder software from Computer Associates, Inc.

Cloud Stack 324 includes database access drivers 338, which preferably are JDBC drivers. Cloud Stack 324 also includes Cloud Application Builder runtime software 340 that is the cloud application framework software that will be deployed in the private cloud.

Finally, Cloud Stack 324 includes third-party libraries 342. The number of library can include one or more such third-party libraries and still be within the scope of the present invention.

Service Registry 345, which has been described previously, contains a register of at least the web services for the cloud applications that are deployed in the private cloud. The Service Registry operates cooperatively with Cloud Controller 302 and Cloud Stack 324 for the deployment of developed cloud applications in the private cloud.

Preferably, Cloud Controller 302, which includes the services described above, and Cloud Stack 324, which includes the software stack described above, form the runtime components along with the cloud application framework that was leveraged to build the cloud application to prepare the cloud application for deployment in the private cloud. With respect to Cloud Controller 302 and Cloud Stack 324, certain components have been specified above; however, it is understood that more or less than these components may make up Cloud Controller 302 and Cloud Stack 324, and they will still be within the scope of the present invention.

Cloud Application Builder 350 is used to develop cloud applications and web services for deployment in the private cloud of the present invention. Cloud Application Builder 350 includes service development toolkit 352, which is primarily used for the development of web services for cloud applications to be deployed in the private cloud. This service development toolkit includes at least tools for use in the development of web services and the user interface components for a cloud application being developed according to the cloud application framework.

Cloud Development Toolkit ("CDT") 354 of Cloud Application Builder 350 is for the development of user interfaces associated with cloud applications to be deployed in the private cloud.

Cloud Application Builder 350 includes software 356 for developing in web applications. Preferably, application development software 356 is Eclipse from the Eclipse Foundation, which provides the integrated development environment ("IDE") for application development, plus the Google web toolkit ("GWT") from Google Inc.

Cloud Application Builder 350 includes testing software 358, which preferably is JUnit software from JUnit.org. Finally, Cloud Application Builder 350 includes web server servlet software 360, which is used for creating dynamic content for the web server for cloud applications being developed for deployment in the cloud. Preferably, the web server servlet software is Apache Tomcat from the Apache Software Foundation.

Figure 4:
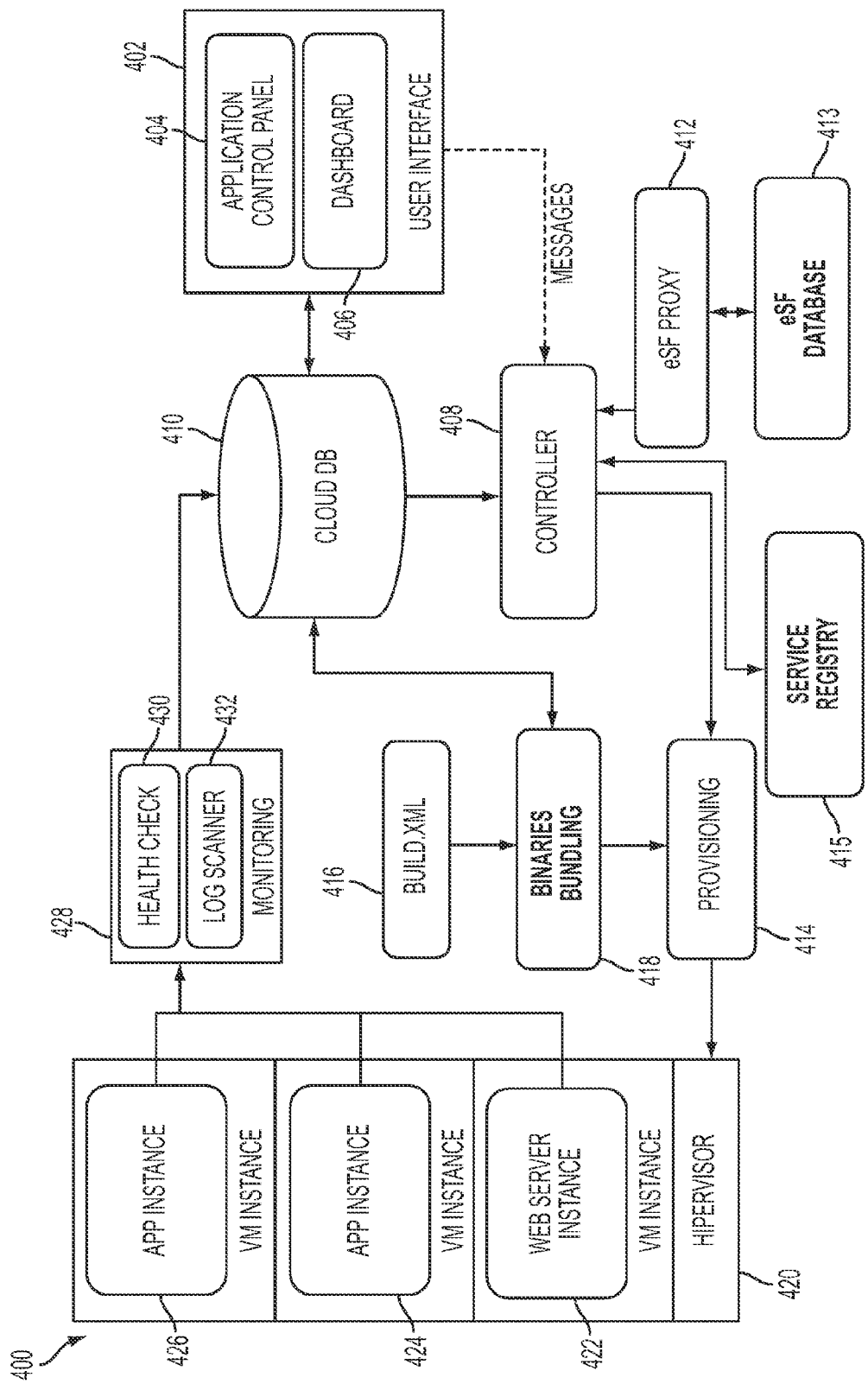
FIG. 4 shows a representative drawing of the logical architecture of the components of the private cloud computing system of the present invention.
Figure 15:
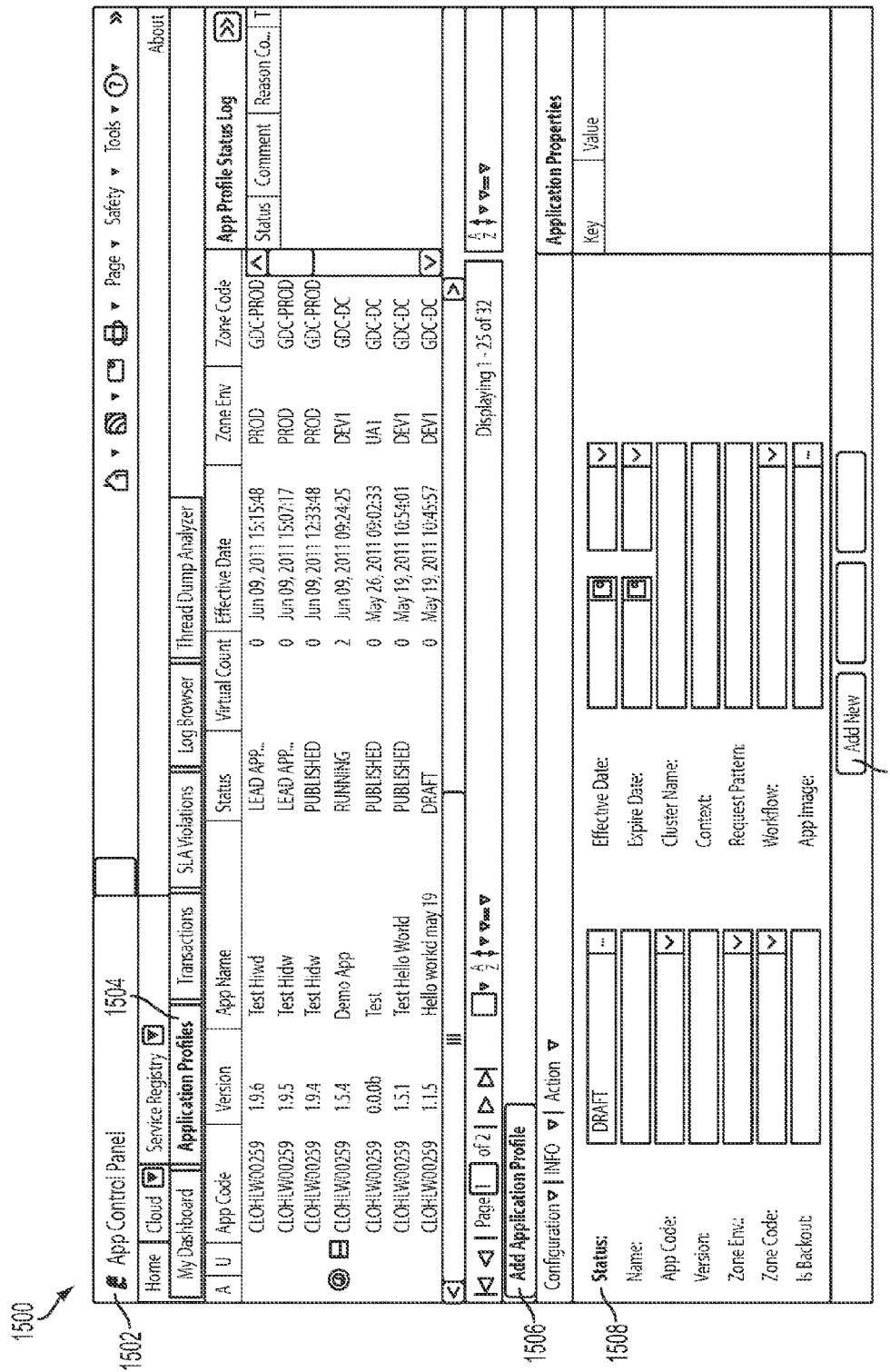
Figure 24:
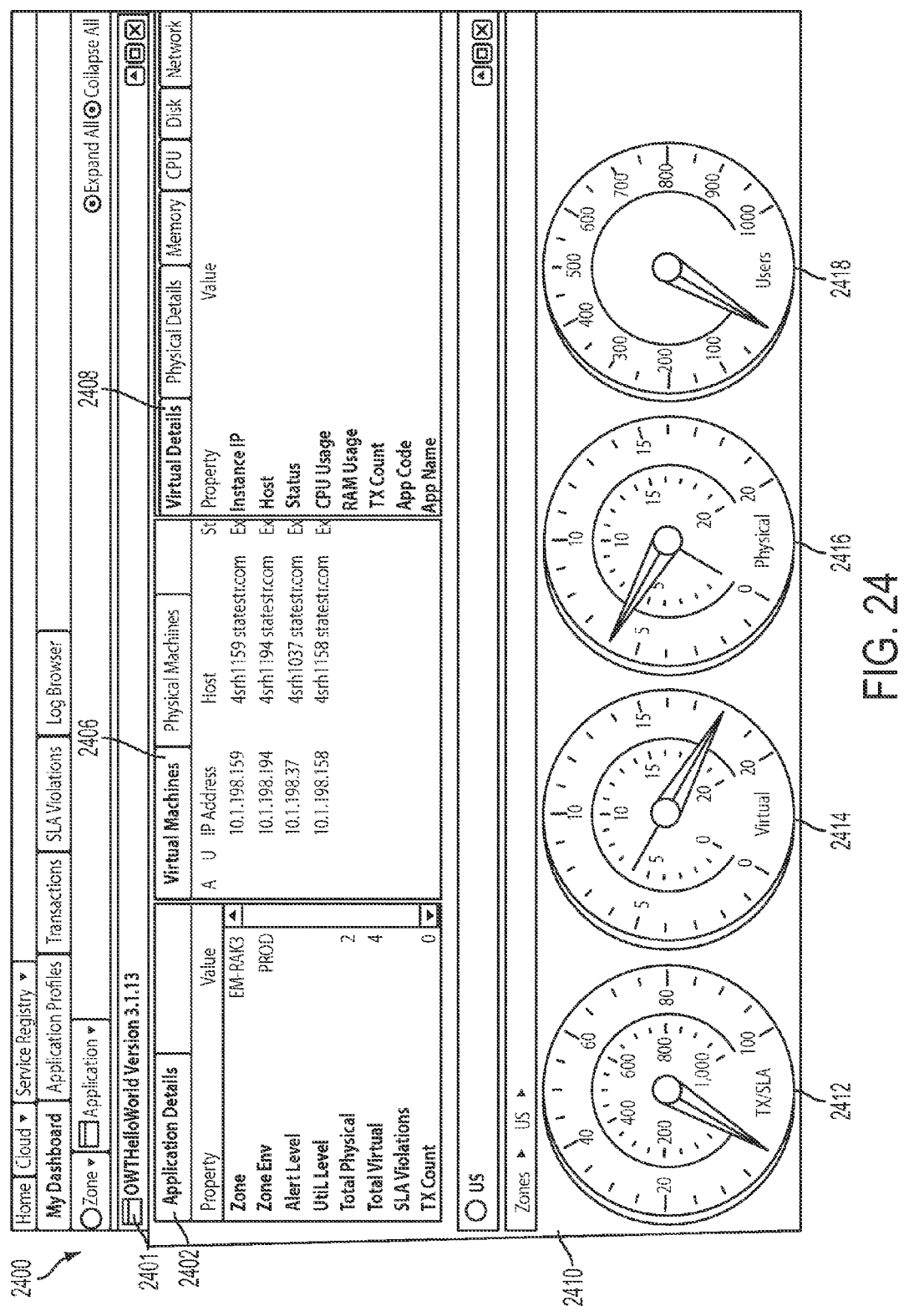

Referring to FIG. 4, generally 400, a representative drawing of the logical architecture of the components of the private cloud computing system of the present invention is shown. User interface 402 is the user interface of a client device. The interface will include application control panel 404 that will include the dashboard 406. A representative application control panel is shown in FIG. 15 and a representative dashboard is shown in FIG. 24.

Application control panel 404 enables developers, managers of cloud applications, owners of cloud applications, software quality assurance ("SQA"), system users, and others to view, use, and manipulate cloud applications in the cloud. Dashboard 406 enables authorized users to manage infrastructure components. User interface 402 is bidirectionally connected to CLDB 410 for accessing cloud applications and associated information, and other data and information stored in CLDB 410.

User interface 402 also connects to Cloud Controller 408 for the purpose of sending messages to the Cloud Controller. Preferably, these messages will include, but are not limited to, requests for access to particular cloud applications and web services, and SLO monitoring.

eSF proxy 412 with eSF database 413 provides security to the cloud. eSF proxy 412 and eSF database 413 provide permissions for cloud application and web services access based on data groups, function groups, and user roles. Data groups, function groups, and user roles are discussed in greater detail with regard to FIGS. 11-14.

The permissions include, but are not limited to, what users have access to particular cloud applications and web services in the cloud, what users can carry out certain functions, for example, providing approvals, changing cloud application profiles, or deleting cloud applications from CLDB 410. Moreover, eSF 412/413 is capable of providing a security infrastructure that will contain and satisfy all of the security requirements for cloud applications that are run in the private cloud, as well as, for the private cloud itself. At least part of the security eSF provides is function level entitlements and the eSF also contains the data to support such security offerings. Is understood that the permissions just described are not exhaustive and there may be additional permissions and it still will be within the scope of the present invention.

Service registry 415 connects to Cloud Controller 408. Service registry 415, which will be discussed in greater detail subsequently, enables developers to search for web services registered for the private cloud and view detailed information about them.

In processing a request from user interface 402 for a particular cloud application or web services, Cloud Controller 408 sends a request to Provisioning services 414. Provisioning services 414 provisions hypervisors and virtual machines that they control to accommodate the needs of client devices running cloud applications in the cloud. As shown in FIG. 4, hypervisor 420 manages web server instance 422, application instance 424, and application instance 426. Each of these software instances is running in a virtual machine instance supervised by hypervisor 420. The private cloud computing system of the present invention can have one or more hypervisors that control cloud application and web server instances that are running in virtual machine instances and still be within the scope of the present invention.

Referring to FIG. 4 at 416, it shows the Build.xml. Build.xml refers to the application build framework that enables developers to build cloud applications using Cloud Application Builder 350 (FIG. 3) and its associated runtime libraries. When such cloud applications are built, the binaries associated with the cloud application are provided to binaries bundler 418. The binaries are then sent for storage in CLDB 410 and provided to Provisioning services 414 for provisioning with a hypervisor so that it will be available to the system users, which include client devices for running the cloud application, and authorized system users with permissions to manipulate the cloud application.

Monitoring services 428 include health check services 430 and log scanning services 432. Health check services 430 monitor the physical and virtual resources of the private cloud. Log scanning services 432 perform automatic and on-demand scans of logs for cloud applications and cloud infrastructure components looking for SLO violations. The information that is determined by health check services 430 and log scanning services 432 is stored on CLDB 410.

Before describing the development of a cloud application, the user interface management of each cloud application will be discussed referring to FIG. 5.

Figure 5:
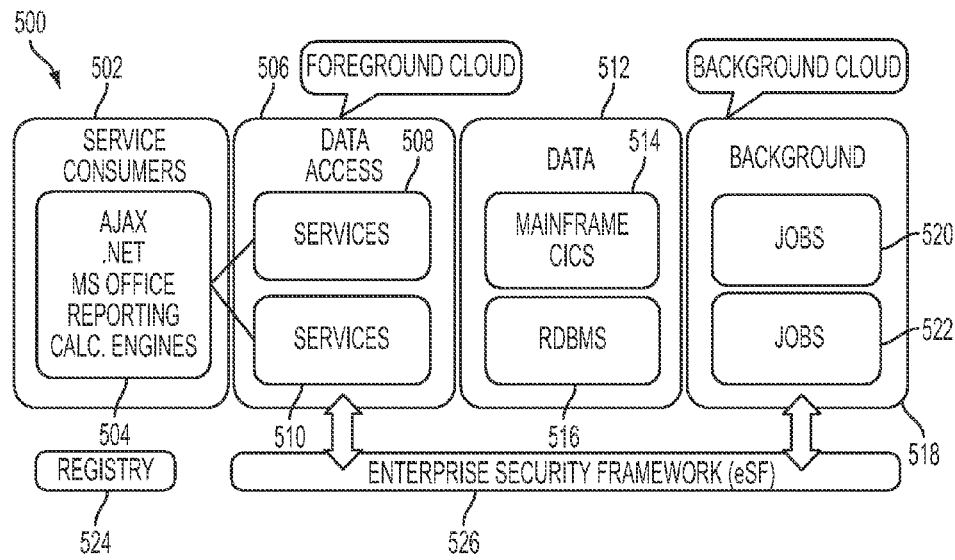
FIG. 5 shows a representative diagram for cloud user interface management of foreground tasks, data storage, and background tasks according to the computer-based computing system of the present invention.

FIG. 5 at 500 shows a representative diagram for user interface management of foreground tasks, data storage, and background tasks for cloud applications on the private cloud. Service consumers 502 are consumers of services that are inside or outside the cloud. An example of a consumer of services outside the private cloud includes services running on a client device, such as those shown at 504.

Data access 506 is directed to foreground services, such as those shown at 508 and 510 that are created for the user interface to access the private cloud. For example, developers could create lightweight user interface components in HTML, Adobe Flash, AJAX, and other tools for this purpose. However, it is understood that other services could be created and still be within the scope of the present invention.

Data storage 512 is directed to online transaction processing ("OLTP") data that is stored in application database 214 separate from warehouse data. Accordingly, the OLTP data is associated with performing database transactions. Examples of OLTP data is shown at 514 and 516 of data storage 512. In data storage 512, mainframe customer information control system ("CICS") 514 will leverage conventional CICS functions for purposes of data storage according to the present invention. Data storage 512 also shows RDBMS 516, which is a relational database management system. For purposes of the present invention RDBMS will leverage conventional relational database management functions for purposes of data storage according to the present invention. However, it is understood that the system of the present invention may include other OLTP data components and still be within the scope of the present invention.

Background 518 is used to create background processes, such as jobs 520 and 522, and manage warehouse data. The creation of jobs will be discussed in greater detail subsequently.

eSF 526, as stated previously, provides security to the cloud. eSF 526 includes what is shown at 412 and 413 in FIG. 4. Through the user interface, eSF 526 is directed to entitlement enforcement. As such, with regard to data access 506 and background 518, eSF 526 controls authorizations to access and use cloud applications and web services by assigning user roles, which preferably are devised by associating stored data with functions within an enterprise.

Service registry 524 refers to the service registry of the private cloud. The service registry enables developers to search for web services and view detailed information about them. Accordingly, the user interface can be used to browse the service registry for web services that can be reused. Further, service registry 524 performs the function of bringing applications and web services into the private cloud and monitoring their SLO compliance and usage. The service registry will be discussed in greater detail with regard to FIG. 6.

Figure 6:
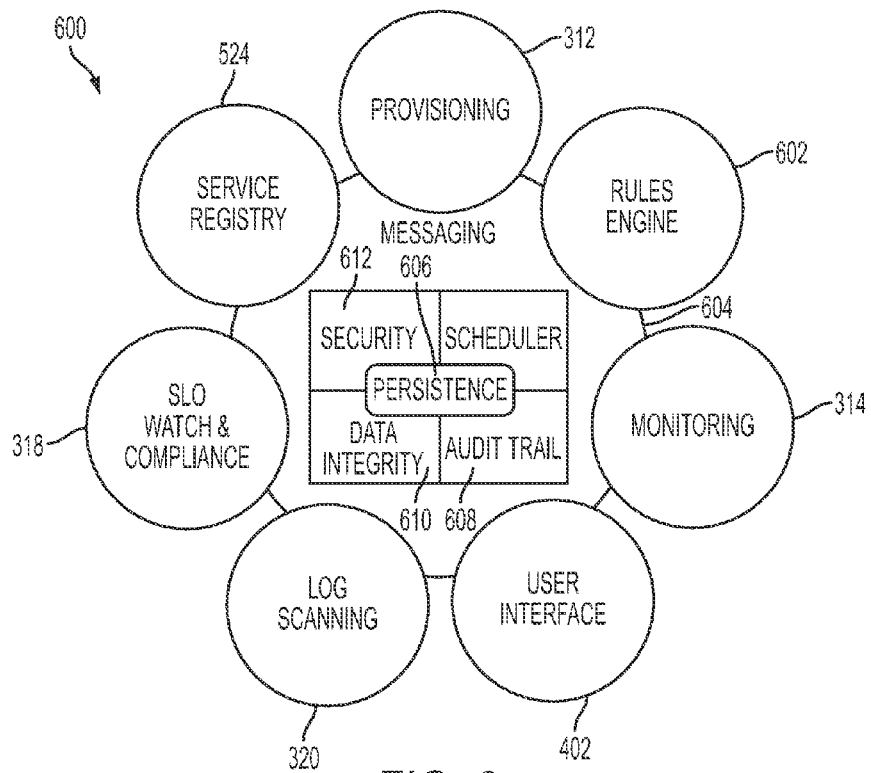
FIG. 6 shows a representative diagram of the logical architecture of the private cloud computing system of the present invention that includes the service registry.

FIG. 6, generally at 600, shows a representative diagram of the architecture of the private cloud computing system of the present invention that shows service registry 524. In FIG. 6, Provisioning Services 312, Monitoring Services 314, SLO watch and compliance services 318, Log Scanning Services 320, and Transaction Browser 323 (not shown) are components of Cloud Controller 302 shown in FIG. 3, and have been previously described. User interface 406 is shown in FIG. 4 and has previously been described. It is understood that Transaction Browser 323 may be shown in FIG. 6 and it would still be within the scope of the present invention.

In the center of FIG. 6 is a persistence state 606, which includes audit trail 608, data integrity 610, security 612, and scheduler 614. Audit trail 608 is for tracking changes with respect to cloud applications. Data integrity 610 is for placing constraints on the application database to ensure data integrity within the database. Scheduler 614 is for scheduling jobs. Security 612 is eSF access security.

Rules engine 602, which is part of the private cloud (the Cloud Controller), will be created by the cloud manager and it will include rules for the operation of cloud applications running within the private cloud. These rules may include, for example, scale-up or scaled-down rules, alert rules, or zone rules. It may contain other rules and still be within the scope of the present invention.

Again referring to FIG. 6, each of the elements is shown connected within messaging environment 604. This enables communications among the various elements.

Referring to Service Registry 524 in FIG. 6, it is contemplated the services registry provides at least four services; however, it is understood that it may provide more or less than four and still be within the scope of the present invention.

The first service that service registry 524 preferably provides is for servicing application programming interfaces ("APIs") for authorized developers to create and manipulate metadata relating to web services. This enables authorized users to create or update the metadata and information on functions and function groups. The APIs reference this information, which preferably is web service details in a service inventory file.

The second service is a search catalog service. The search catalog service enables authorized system users to search for and discover web services on a catalog search page of the service registry.

Third service of service registry 524 is a browse category service. This service enables authorized system users to drill down from cloud application function group to a list of constituent web services on an application browser page of the service registry.

Figure 26:
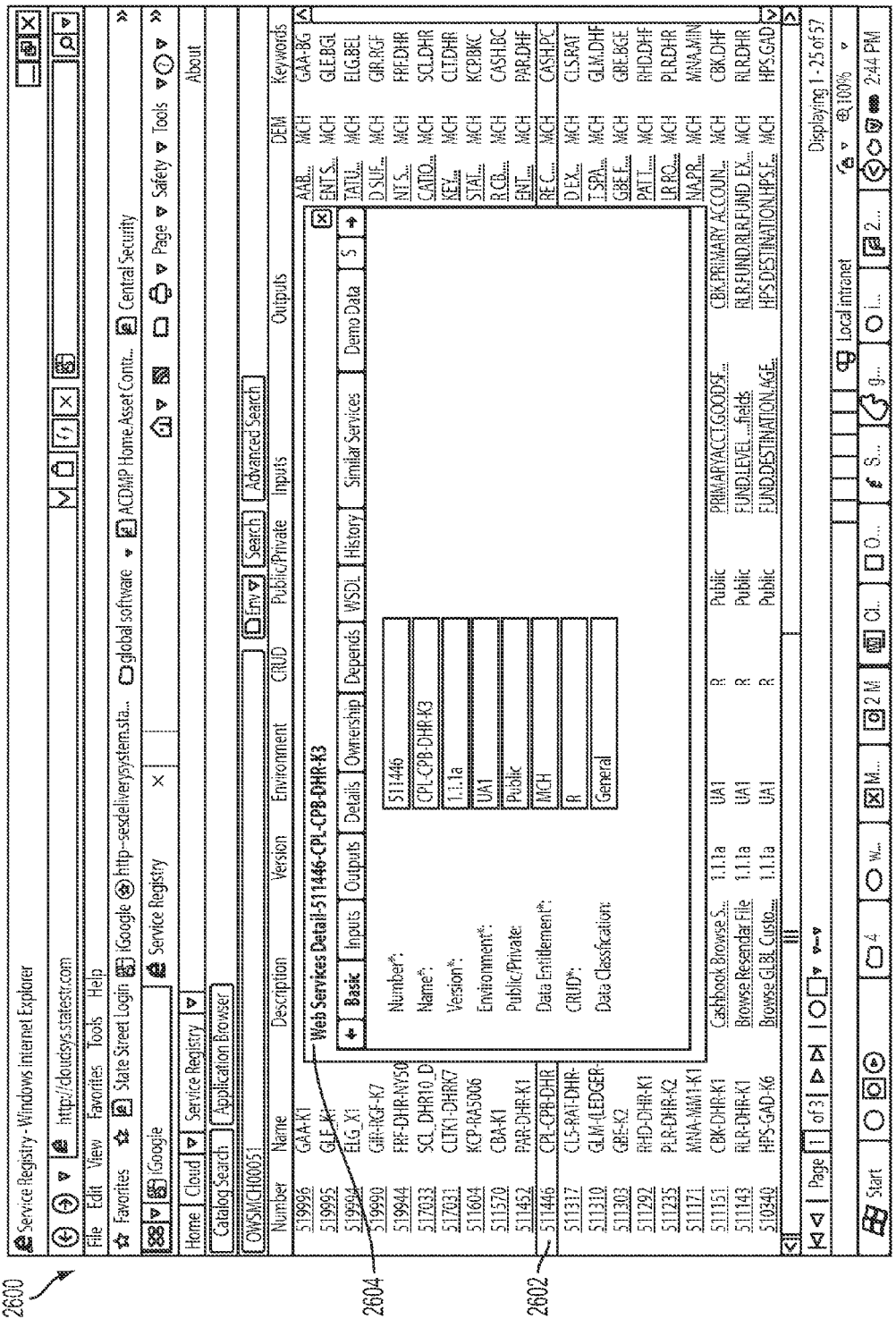
FIG. 26 shows a representative web services detail display screen according to the computer-based private cloud system of the present invention.

The fourth service of the service registry is a web service details service. This service provides metadata and other information that authorized system users can access on the various tabs of the web services details dialog box of the user interface as shown in FIG. 26.

Figure 7:
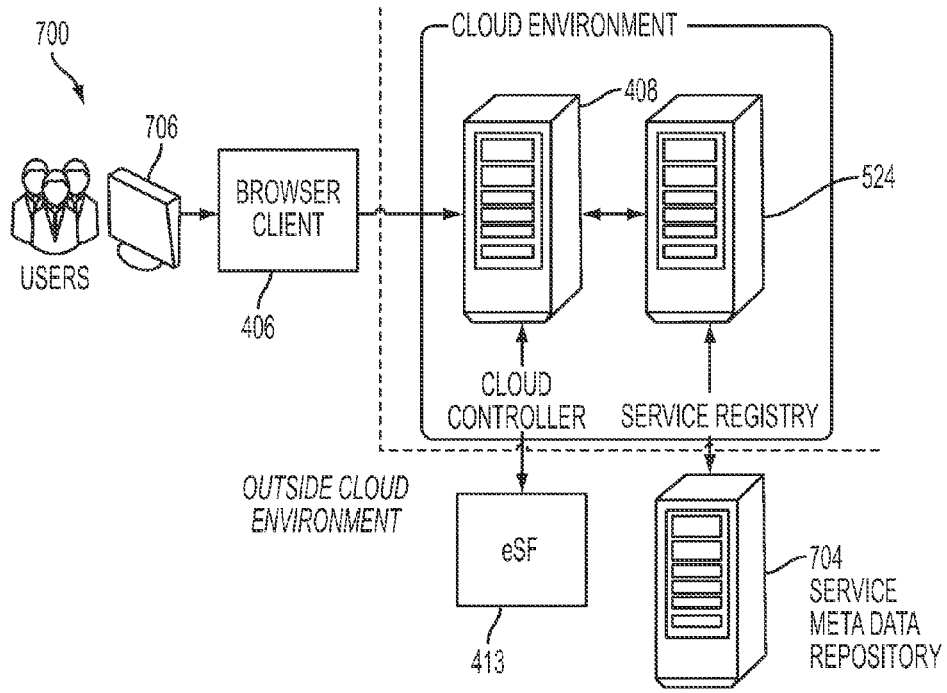
FIG. 7 shows a representative diagram of service registry architecture of the computer-based private cloud computing system of the present invention.

Referring to FIG. 7, generally at 700, representative service registry architecture is shown. Service registry 524 (FIG. 5) connects to Cloud Controller 408 (FIG. 4). As shown, both Cloud Controller 408 and service registry 524 are within the private cloud. Also connected to service registry 524 from outside the cloud is service metadata repository 704, which is a metadata database. Further, eSF 412/413 (FIG. 4) connects to Cloud Controller 408 from outside the cloud. Although not shown, eSF proxy 412 will be disposed between eSF database 413 and Cloud Controller 408, but in the private cloud.

Cloud Controller 408 connect to browser client (user interface) 402. Browser client 402 provides content to users 706 and permits them to access service registry 524.

The integration of eSF with service registry 524 insures access to cloud applications, web services, and user interface items, such as button and menu options, is restricted to only authorized system users. This is based on carefully defined roles that determine access for developers and users. Examples of this access control will be discussed subsequently.

The components of a cloud application to be developed in the cloud include a user interface, registered web services that offer potential reuse, and registry of background jobs that can be reused. The developer that is creating cloud application for deploying in the private cloud also may create business rules and/or Java classes that relate to web services and jobs. Once the components of the cloud application are created, they can be stored in CLDB 410. The creation of these components may take place within the private cloud environment.

In developing the web services, user interface components, and batch jobs, there will be a requirements analysis done by the developer with regard to a cloud application to identify the web services that embody his/her application, the user interface components needed to accomplish the tasks of the cloud application, and the batch jobs needed to store the data for the cloud application. In performing these tasks, in the Cloud Controller the developer can browse and look up registered services in the service registry to see if any can be reused in his/her cloud application.

According to the system and method of the present invention, before web services can be created for a cloud application, the developer must obtain an application identifier that includes a cloud application code and its extension. This will track an application through the development process including the creation of cloud application profile for the cloud application. Preferably, before the cloud application can be moved further toward the private cloud environment, the source code for the cloud application is placed in a source code control system. Once this task has been performed, the cloud application and its components can be developed using Cloud Application Builder 350 (FIG. 3).

With regard to a particular cloud application, the development of the web service component will include the developer creating metadata for the service definition and completing the service inventory file for the cloud application. Each cloud application will have a service inventory file associated with it that describes the function groups in all member web services. Cloud Controller 302 (FIG. 3) uses this data to update the service registry automatically when a cloud application is deployed.

Preferably, the developer builds separate .war ("web archive") files for foreground and background processes (see FIG. 5), bundles the binaries associated with the cloud application, and then creates a cloud application profile. The binaries that are associated with the foreground processes relate to web services and the user interface components. The binaries that are associated with the background processes relate to jobs. However, before the developer can deploy the web service for use in the cloud, the appropriate approvals must be obtained, which will trigger service registry updates and adjustment to the associated eSF roles stored in the eSF. This process of development is shown graphically in FIG. 8.

Figure 8:
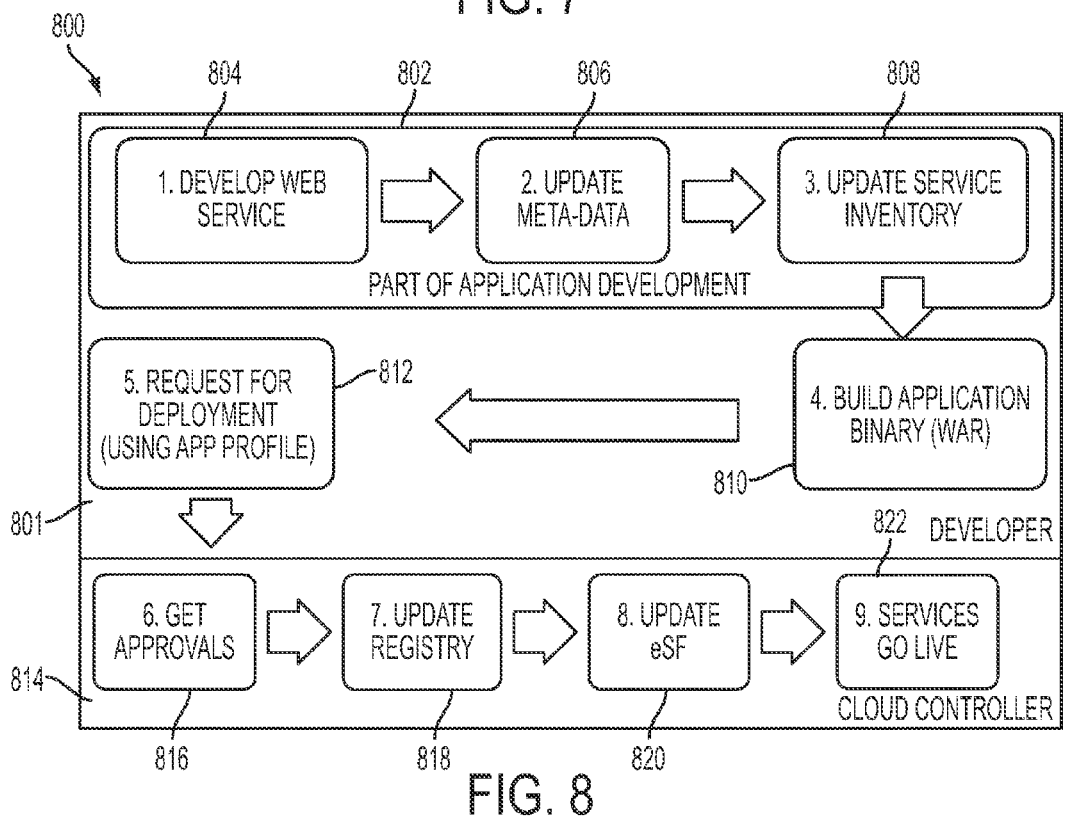
FIG. 8 shows a representative graphical drawing of the process for development of a web service component of a cloud application according to the computer-based private cloud computing system of the present invention.

FIG. 8, generally at 800, shows a representative drawing of the process for development of a web service component for a cloud application to be deployed in the private cloud. As part of cloud application development and deployment process, developer 801 will develop the web service at 804 that is associated with the cloud application. When the web service is developed, at 806, the developer will update the metadata in the service definition that will be used at 808 to update the service inventory file. This completes the portion of web service development associated with cloud application development.

Following the update of the service inventory file at 808, the developer builds an application binary file for the foreground and background processes at 810. The binaries associated with the cloud application are bundled, and at 812, a request to deploy the web services is made using the cloud application profile that has been created for the cloud application. This request is sent by the developer using a client device user interface to Cloud Controller 814. At 816, approvals by the appropriate authorized users are requested. If the approval is denied, then notification is sent back to the developer via appropriate messaging. However, if approval is granted, there is an update sent to the service registry for the web service at 818 and there is an update of the eSF at 820 with the appropriate permissions for the use of the web service. Following this, the web service is provided live at 822 in the private cloud. Preferably, the private cloud uses the metadata in the service definition and the service inventory file to automatically update the service registry when the web service is deployed.

As stated, a user interface also is a component of a cloud application. Cloud Application Builder 350, through CDT 354 and appropriate panels on the user interface, develop the user interface component that is to be associated with a particular cloud application. This toolkit permits developers to extend the web services associated with cloud application to the user interface. Preferably, the toolkit will support Flash and Microsoft Office based user interface development.

Cloud applications deployed in the private cloud can be embedded in non-cloud web pages. If this is done, all the functionality of the cloud application can be accessed from that webpage with the user interface as a pop-up, but the web services will be running in the private cloud.

The last component of a cloud application is background jobs. These jobs are batch jobs that run in the background and store information in the cloud and other databases. The background jobs for a cloud application can run in two instances that can be located on different machines. For example, these jobs are run active-active in two separate data centers. Background jobs can involve processing that helps the cloud application server handle scalability without hanging up threads in the foreground.

Figure 9:
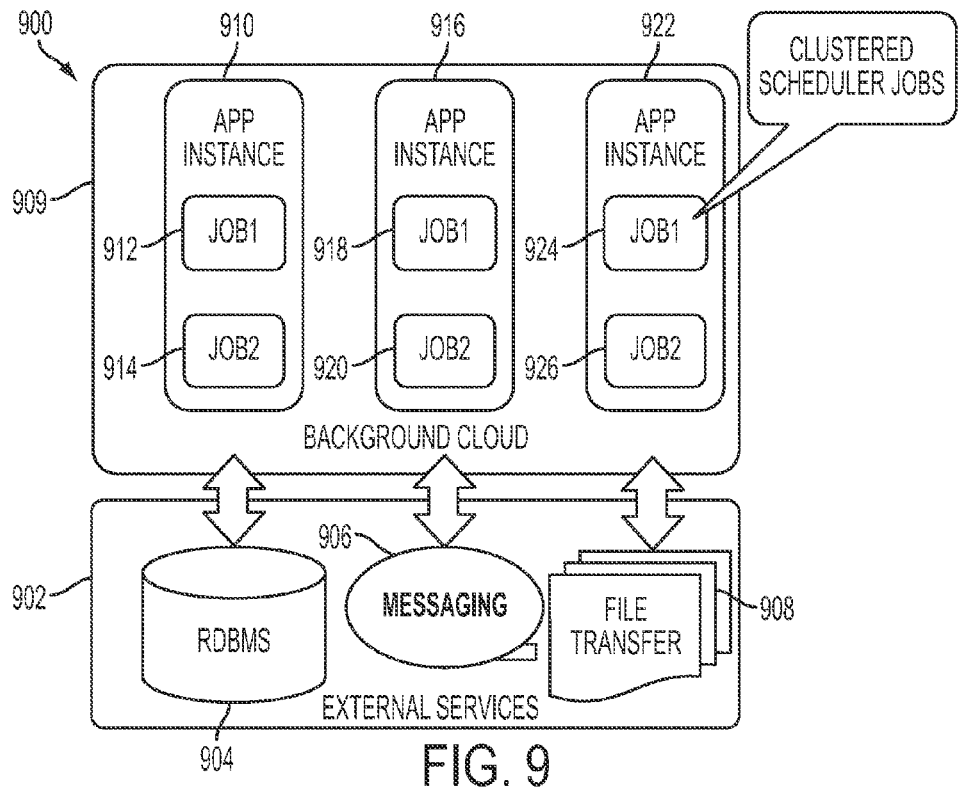
FIG. 9 shows a representative diagram for background job development and handling according to the computer-based private cloud computing system of the present invention.

Referring to FIG. 9, generally at 900, a representative diagram is shown for background job development and handling. In FIG. 9, external services 902 connect to background cloud 909. External services 902 include RDBMS 904, messaging 906, and file transfer service 908. Each of these has been previously described with regard to other figures, and, as such, those descriptions apply equally here and are incorporated by reference.

Background cloud 909 includes three representative cloud application instances at 910, 916, and 922, respectively. Application instance 910 shows batch jobs 912 and 914; application instance 916 shows batch jobs 918 and 920; and application instance 922 shows batch jobs 924 and 926. A scheduler, not shown, manages the jobs and handles multiple application instances, such as those shown in FIG. 9. The batch jobs that are shown in background cloud 909 can be bundled in a separate .war file that can contain multiple jobs. These jobs can then be stored in CLDB 410 and be associated with the appropriate cloud application.

As stated previously, eSF handles cloud application security. Preferably, cloud application developers will set up eSF roles and use an eSF proxy API to secure protected items. The use of eSF security will be explained in greater detail referring to FIG. 10.

Figure 10:
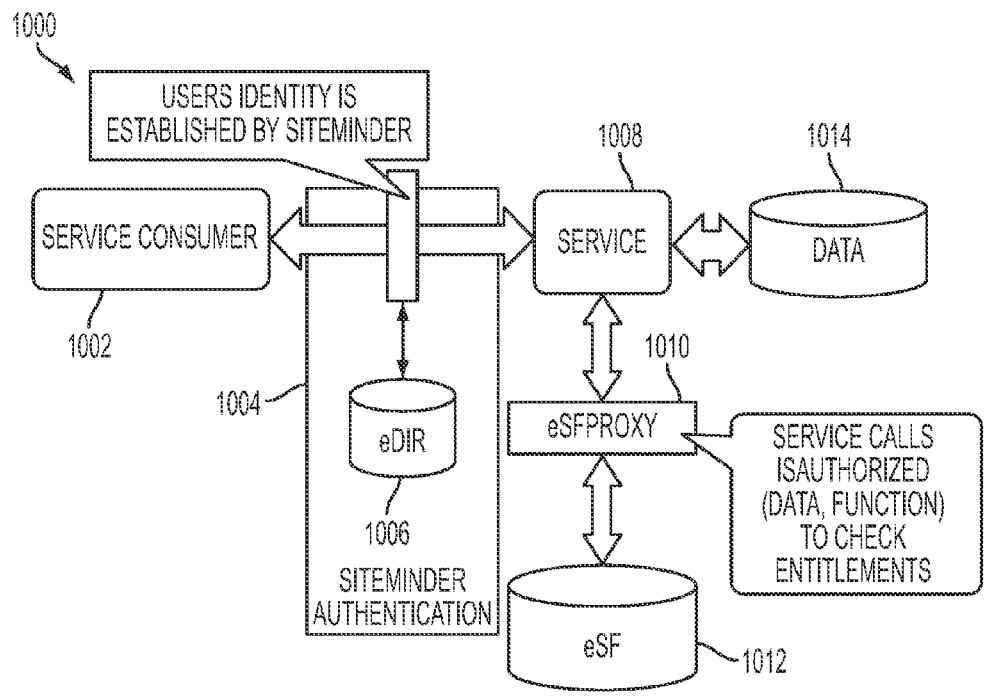
FIG. 10 shows a representative diagram for implementing eSF security.

Referring to FIG. 10, generally at 1000, a representative diagram for implementing eSF security is shown. When a system user requests cloud application or web services access, the system user, shown as service consumer 1002, must be authenticated. As such, SiteMinder 1004 will check the system user's authentication by querying eDirectory 1006. If authentication is confirmed, then requested web service 1008 associated with a cloud application communicates with eSF proxy 1010 to check the system user's eSF entitlements in eSF database 1012. These entitlements will include whether the system user is authorized to perform the function specified in the service request. If the system user is authorized, then the system user will have access through the web service to database information at 1014. If the system user is not authorized, then access will be denied.

Previously, it has been discussed that access to cloud applications and web services may be based on the roles. For purposes of the present invention, function groups are a collection of functions that enable an authorized system user to perform operations on whatever data that relates to that system user's job description. Preferably, function groups will have access to particular data defined by the cloud application developer. The function groups and functions will be defined in the service inventory file and be deployed as part of the application binary files that will update the service registry and eSF database. An example of the formation of functional groups and the services to which these function groups will have access is shown in FIG. 11.

Figure 11:
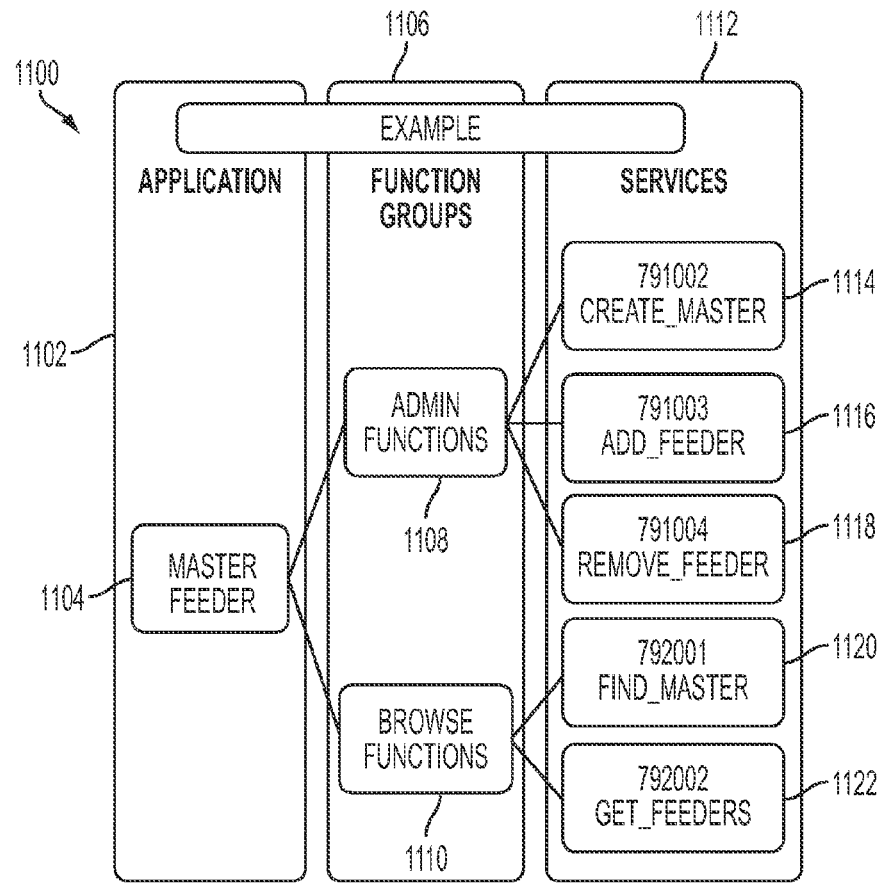
FIG. 11 shows a representative diagram related to function group formation for a cloud application and the services to which such formed function groups have access.

FIG. 11, generally at 1100, shows a diagram of function groups related to a cloud application and the services to which each of these groups have access. At cloud application block 1102, it shows a cloud application titled "Master Feeder." The developer of the Master Feeder cloud application 1104 has defined two function groups at function groups block 1106. The first function group at 1108 is defined with administrative functions and the second function group at 1110 is defined with browse functions.

At services block 1112, the registered services for Master Feeder cloud application 1104 are shown. With regard to the first function group at 1108, this function group is permitted to perform the services that are registered as 791002, 791003, and 791004. This will permit the first function group to Create Master, Add Feeder, and Remove Feeder, respectively.

With regard to the second function group at 1110, this function group is permitted to perform the services that are registered as 792001 and 792002. This will permit the second function group to Find Master and to Get Feeders, respectively. It is noted that the second function group would not be permitted to have access to the services authorized for the first function group.

Figure 12:
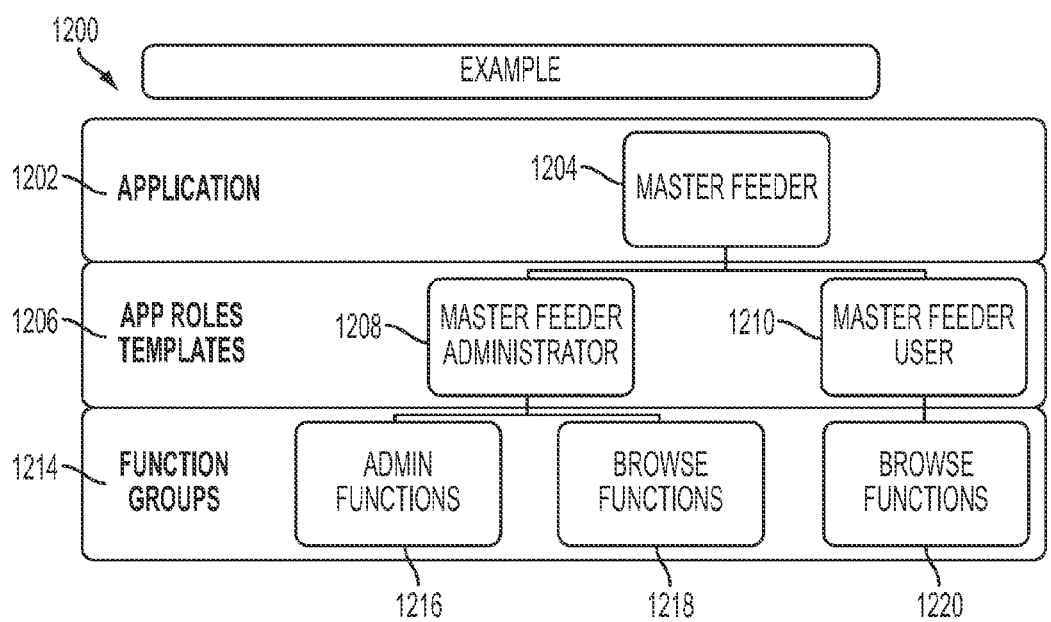
FIG. 12 shows a representative diagram relating to cloud application roles that are used for defining function groups.

The defining of function groups is based on cloud application roles. Referring to FIG. 12, the method by which these roles define function groups will be discussed.

Referring to FIG. 12, generally at 1200, the use of cloud application roles to define function groups is shown. Cloud application block 1202 shows a cloud application titled "Master Feeder." At cloud application roles templates block 1206, the application developer has defined the roles associated with the Master Feeder cloud application. These roles are Master Feeder Administrator at 1208 and Master Feeder User at 1210. Preferably, the cloud application roles templates are constructed by evaluating the functions that a system user must perform, assembling these functions in a function group, and identifying the data group that contains all the data that may be manipulated by the system user.

As shown in FIG. 12 at functions groups block 1214, the role of a Master Feeder Administrator shown at 1208 may be separated into two function groups. The first function group would be one in which the system user would be permitted the administrative functions at 1216 and the second would be only the browse functions at 1218.

As stated, the cloud application roles defined by the developer of the cloud application also provide for the Master Feeder User at 1210. The function group that is assigned to this role would be permitted the browse functions at 1220. These browse functions may be the same or different from those for a Master Feeder Administrator and still be within the scope of the present invention.

The cloud application role templates will be part of the service inventory file and will update the eSF when the cloud application is deployed in the private cloud.

Figure 13:
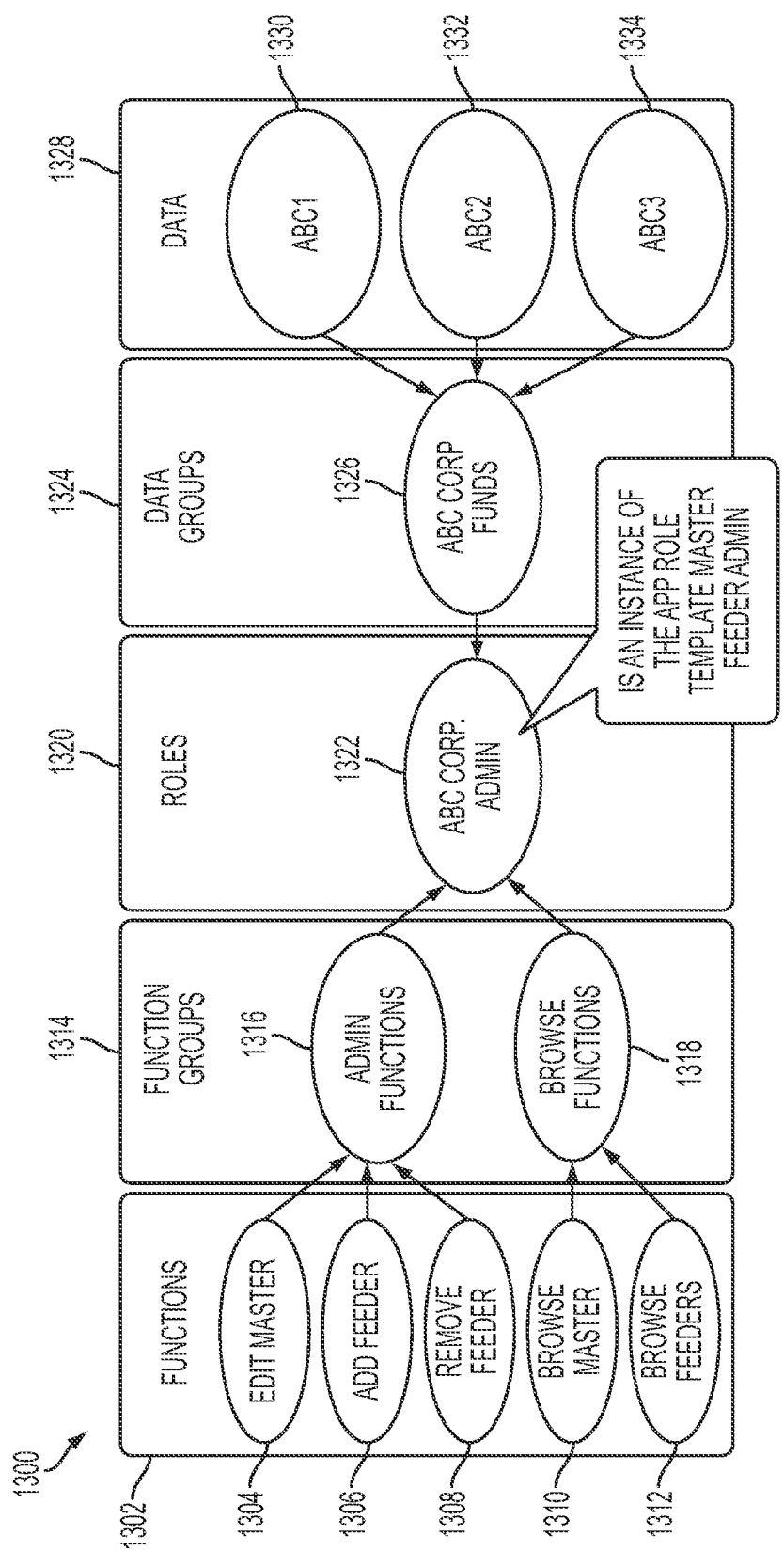
FIG. 13 shows a representative diagram of an eSF entitlement map for an administrator role shown in FIG. 12.

FIG. 13, generally at 1300, shows an eSF entitlement map for an administrator role shown in FIG. 12. In functions block 1302, it shows the functions that are available for the first function group at 1316 and the second function group at 1318 in function groups block 1314. As shown, the first function group at 1316 is permitted the functions of Edit Master at 1304, Add Feeder at 1306, and Remove Feeder at 1308. In a similar fashion, the second function group at 1318 is permitted the functions of Browse Master at 1310 and Browse Feeders at 1312.

At roles block 1320, it shows that the role at 1322 is for an administrator at ABC Corporation. At data groups block 1324, it shows that the administrator receives data regarding ABC Corporation's funds at 1326, which may be mutual funds for example. Data block 1328, which may be a repository of specific data regarding ABC Corporation's funds, include ABC1 data at 1330, ABC2 data at 1332, and ABC3 data at 1334 to which the administrator at 1322 will have access through data groups block 1324 at 1326. In reviewing the entitlement map with regard to the Master Feeder cloud application, the restrictions based on function groups is enforced according to the map.

Figure 14:
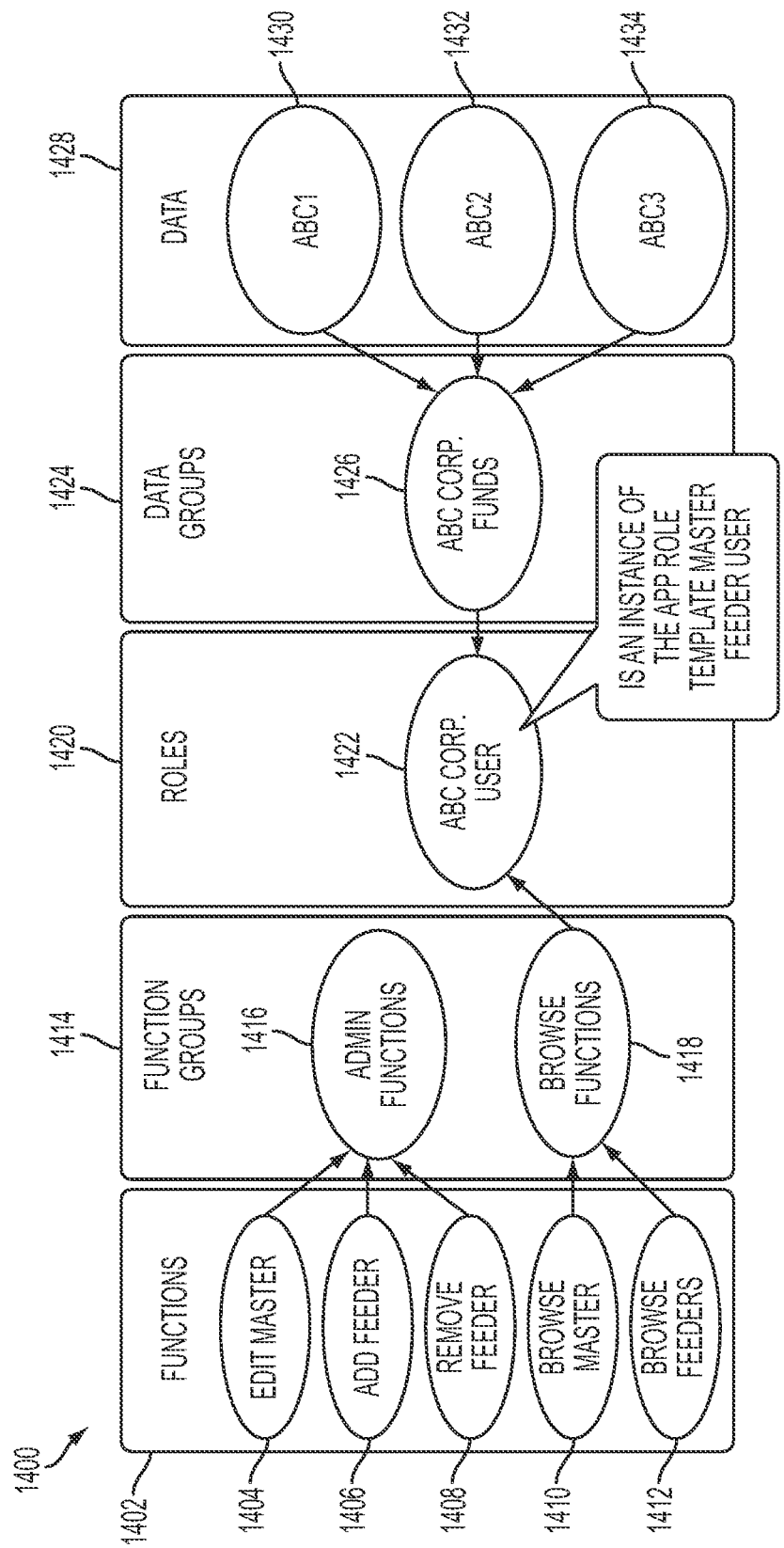
FIG. 14 shows a representative diagram of an eSF entitlement map for the system user role shown in FIG. 12.

FIG. 14, generally at 1400, it shows an eSF entitlement map for the user role shown in FIG. 12. In functions block 1402, it shows the functions that are available for first function group at 1416 and the second function group at 1418 in function groups block 1414. As shown, the first function group at 1416 is permitted the functions of Edit Master at 1404, Add Feeder at 1406, and Remove Feeder at 1408. In a similar fashion, the second function group at 1418 is permitted the functions of Browse Master at 1410 and Browse Feeders at 1412.

At roles block 1420, it shows that the role at 1422 is for a system user at ABC Corporation. At data groups block 1424, it shows that the system user receives data regarding ABC Corporation's funds at 1426, which, as in FIG. 13, may be mutual funds. Data block 1428, which may be a repository of specific data regarding ABC Corporation's funds, include ABC1 data at 1430, ABC2 data at 1432, and ABC3 data at 1434 to which the system user at 1422 will have access through data groups block 1424 at 1426. In reviewing the entitlement map with regard to the Master Feeder cloud application, the restrictions based on function groups is enforced according to the map. As such, since the role at roles block 1420 is only for a system user, the system user is only permitted the browse function at 1418 in functions group block 1414. As part of this function group, the system user is only permitted to Browse a Master at 1410 and Browse Feeders at 1412 of functions block 1402.

Previously, with regard to FIG. 8, the process for developing and deploying a cloud application in the private cloud was discussed. That process will now be described in greater detail referring to FIGS. 15-22.

Preferably, there are five main steps for deploying a cloud application in the private cloud. This process may be referred to as the cloud application promotion process. The five main steps include bundling application binaries and exporting the bundled application binaries to the private cloud, creating and editing a cloud application profile for deploying the cloud application in the private cloud, obtaining the appropriate approvals for deploying the cloud application in the private cloud, performing a certified build of the application so that it can be promoted to user acceptance testing ("UAT"), and setting and changing system properties in the cloud application profile for cloud application promotion to the private cloud.

Prior to beginning the cloud application promotion process by deploying the cloud application to the development ("DEV") environment, preferably, the developer will obtain the previously discussed application identifier for the application. Further, the developer will have requested that the appropriate Cloud Controller access eSF role entitlements be set up in eSF for the developer so that the developer has the appropriate roles to deploy the cloud application. The developer will create a build project for the cloud application in the Cloud Application Builder 350 (FIG. 3) and run appropriate tests on the cloud application. Then, the developer will build the cloud application in the cloud application builder so that the developer is ready to bundle the binaries associated with the cloud application for export to the private cloud.

Once the above steps have been accomplished, the cloud application binaries are bundled and the Cloud Controller promotes the approved and secure web services associated with the cloud application to the private cloud. According to the present invention, the binaries bundler can be invoked from the developer's client device after a build for proof of concept ("POC"), DEV, and System Integration ("SYS") deployments. However, the binaries bundler can only be invoked by higher-level build machines, for example, ClearCase build machines or other certified build machines, for the UAT and Production ("PROD") deployments.

For purposes of the present invention, in POC and DEV deployments, the developer can build the .war file from his/her client device. In SYS, to promote a cloud application image to UAT, preferably, it will be done from designated machines, such as certified machines where the developer can run ClearCase build scripts or other change control mechanism.

Cloud applications for UAT and PROD deployment do not go directly to the private cloud from a build. When the developer creates a cloud application profile for UAT, the developer picks a cloud application that was built for SYS on a certified build machine, preferably, where ClearCase build scripts can run. For PROD, the developer picks a cloud application that was promoted to UAT. As such, this makes the cloud application deployed in UAT and PROD the same as the cloud application that was tested in the previous environment in the application promotion process. Although, what has just been described as the preferred method for application promotion, it is understood that other methods are possible and can still be within the scope of the present invention.

The four deployment environments discussed above will now be discussed in view of the promotion process as it relates to the creation of cloud application profiles.

DEV—After the developer has done development and testing of the cloud application, he/she can export the cloud application's .war file to the private cloud. The developer using the user interface can select Application Profile tab on the user interface. The cloud application's initial status is DRAFT. The developer will provide the appropriate information for completing the cloud application profile and select a cloud application for association with it. The developer will then change the status to PUBLISHED. The developer's cloud application will run in the DEV environment upon approval by the appropriate level cloud manager.

SYS—Only cloud applications running in DEV can be promoted to SYS. In SYS, a cloud application may be built on a certified build machine, for example, a build machine running ClearCase build scripts.

UAT—Only cloud applications running in SYS can be promoted to UAT.

PROD—Only cloud applications running in UAT can be promoted to PROD, where such cloud applications will be run live on the private cloud.

The method for creating a cloud application profile and changing the status of the cloud application from DRAFT to PUBLISHED will now be described referring to FIGS. 15-22.

Referring to FIG. 15, generally at 1500, a representative cloud application control panel is shown at 1502. To generate a new application profile, Application Profiles tab 1504 is activated which will provide the lower screen that has Add Application Profile tab 1506. As seen at status line 1508, the initial status is always DRAFT. When Add New button 1510 is activated, it will cause Add New Application Profile window 1600 to be displayed.

Referring to FIG. 16, in Add New Application Profile 1600, the name of the cloud application is entered in the name field 1602. Then, in App Code field 1604, the button is selected to provide the drop-down list and the appropriate application identifier is selected that has been assigned to this particular cloud application. It is now necessary to complete the remainder of the profile.

First, the version of the application is entered in Version field 1606. Then, in Zone Environment field 1608, the button is selected to provide the drop-down list and the appropriate environment for deployment is selected. Similarly, in Zone Code field 1610, the button is selected to provide the drop-down list, such as the drop-down list shown in FIG. 17, generally at 1700. When the appropriate Zone Code is selected, it will populate Zone Code field 1610.

Next, an effective date and time are selected in Effective Date field 1612. The selection of a future date enables the approval process to complete and this will be the date on which the private cloud will start running the cloud application. If the effective date passes without approval, the private cloud will start running the cloud application when the approval process is complete. The Expire Date field 1614 may be completed but it is optional.

Context field 1616 will include the context for the cloud application. For example, the context field will provide the fully qualified path for a cloud application, such as, for example, http://Cloud.statestreet.com/Appl/[default].

In Requests Pattern field 1618, the service request prefix or other characters are added. For example, the service request prefix for routing that is found in this field is provided by the Cloud Controller.

Figure 19:
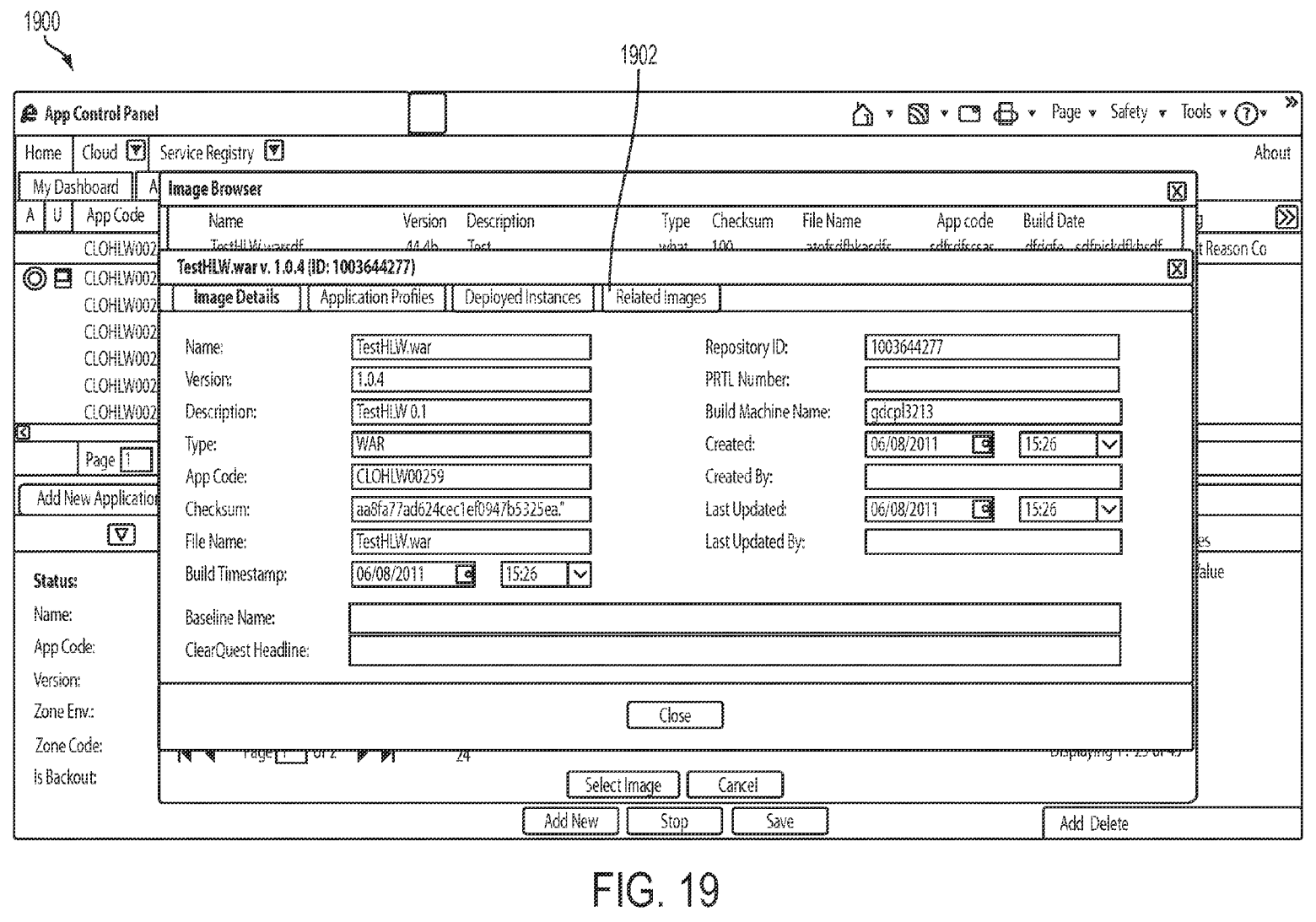
Figure 20:
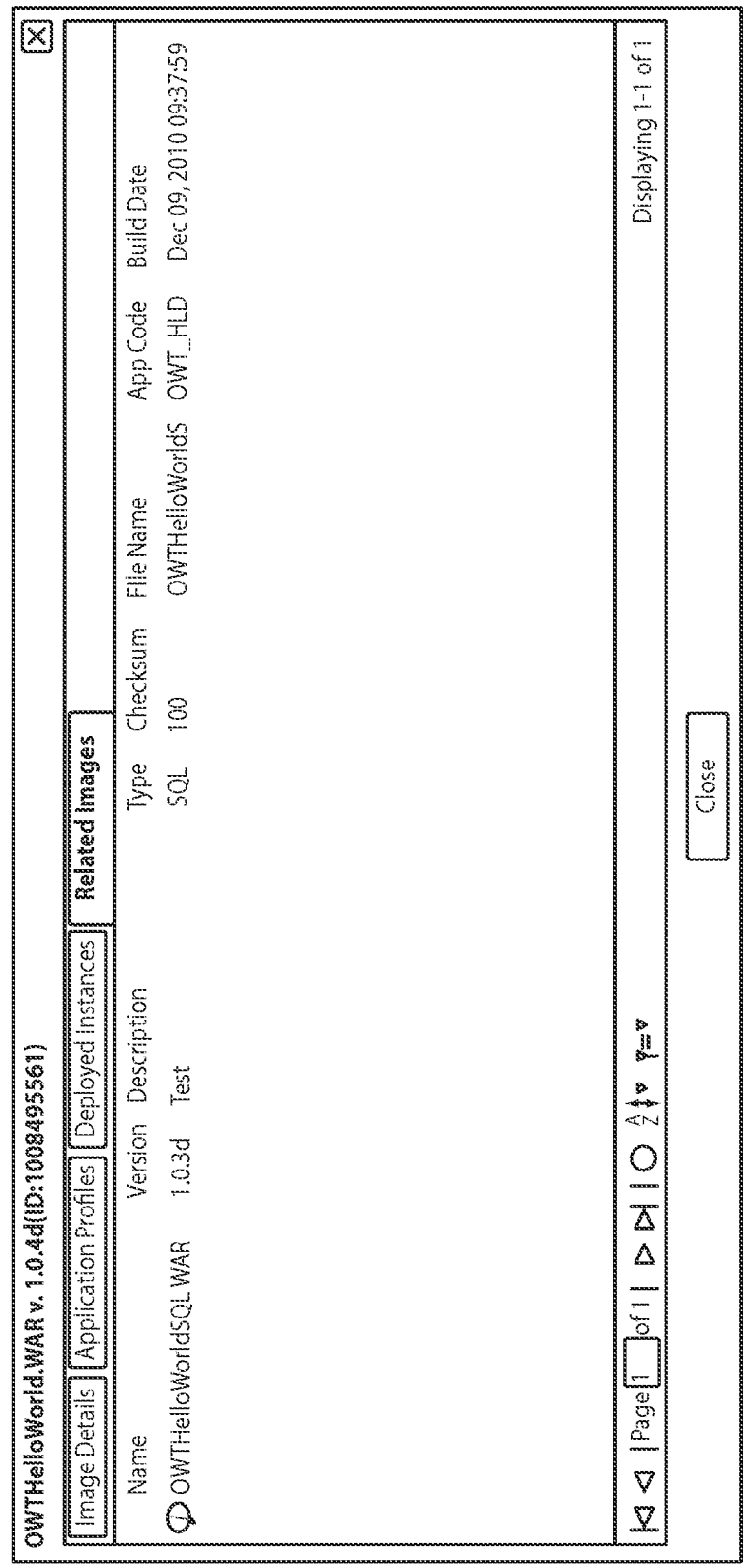
Figure 21:
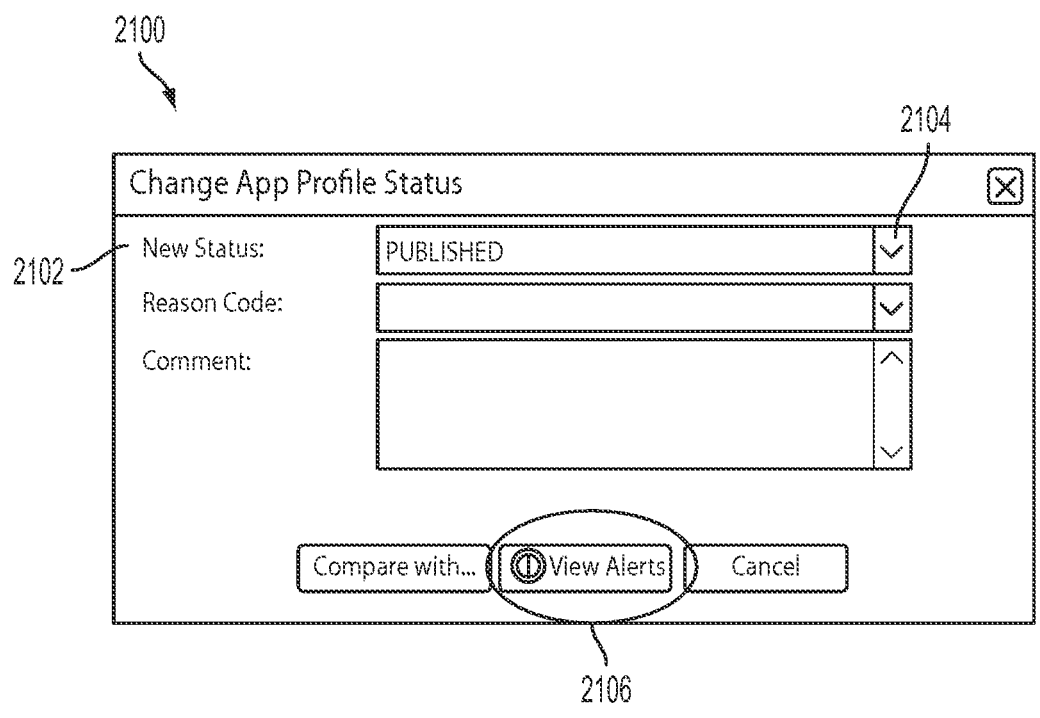

In order to populate App Image field 1620, button 1622 is activated which will open Image Browser Dialogue window 1800 in FIG. 18. Here, the appropriate cloud application is selected. By selecting the information icon at 1802, the dialogue window shown at 1900 in FIG. 19 is displayed, which shows the cloud application details. Once it is confirmed that the cloud application details are correct, Related Images tab 1902 is activated which will open the display window at 2000 in FIG. 20. After the information in the display window shown in FIG. 20 is verified, this window is closed along with the Image Browser window shown in FIG. 19. Then, the select image button at 1804 in FIG. 18 is activated and then the Save button at 1624 in FIG. 16 is activated to save the new application profile. When the save is complete, the status of the cloud application is set to DRAFT.

To change the status from DRAFT to PUBLISHED, it is necessary to activate button 1628 in Status field 1626 in FIG. 16. This will open the App Change Profile Status display window shown in FIG. 21 at 2100. In New Status field 2102, the button at 2104 is selected to provide the drop-down list and the appropriate status is selected, which in this example is PUBLISHED.

Figure 22:
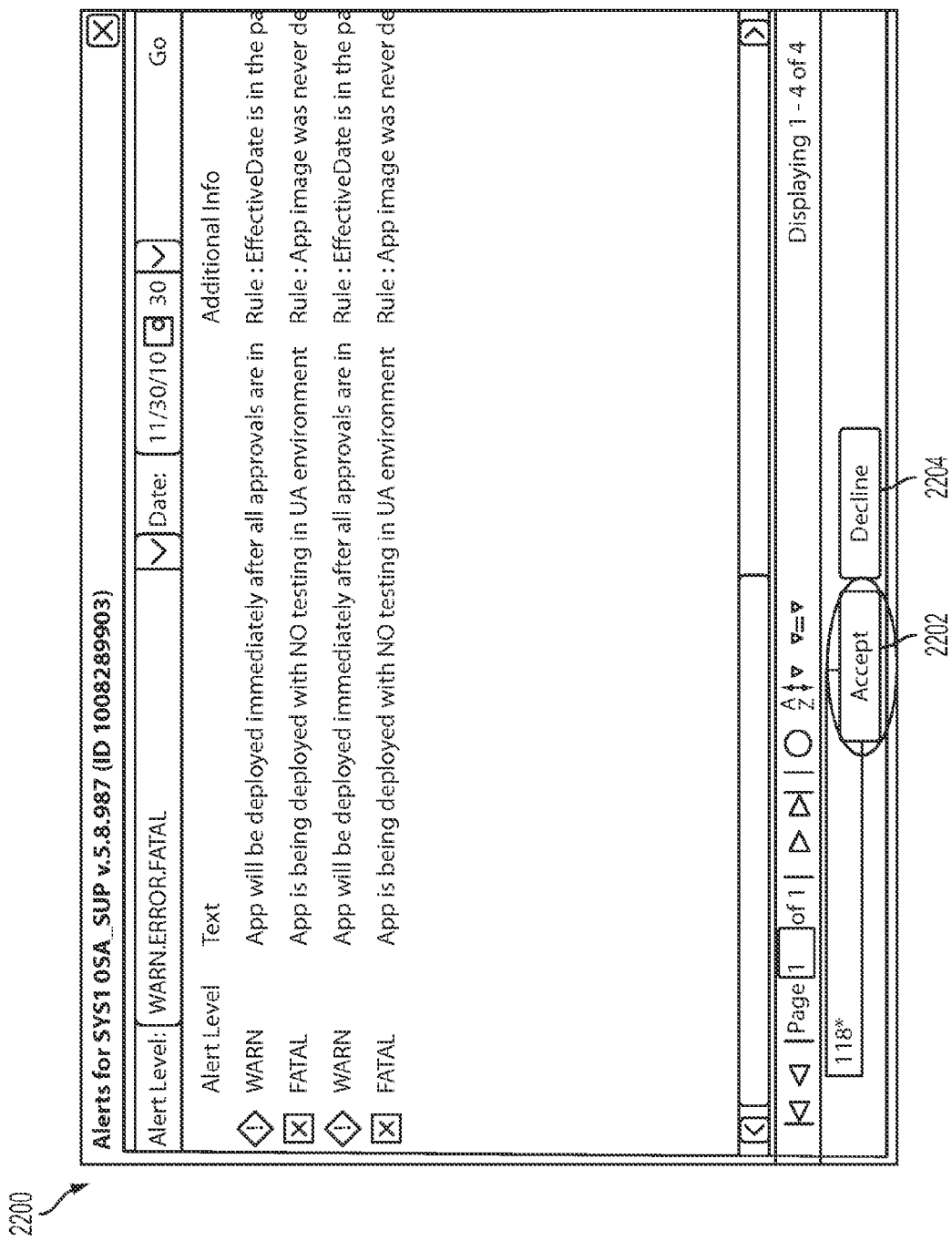

Next, the View Alerts button at 2106 is activated which will open Alerts dialog window 2200 shown in FIG. 22. If the alerts are accepted, then the Accept button at 2202 is activated and the status of the cloud application is changed to PUBLISHED, and it can go live in the private cloud once all the approvals are obtained. If however the Decline button at 2204 is activated because of the nature of the alerts, then the status of the application will not be changed to PUBLISHED and it will not go live on the private cloud.

Alerts have been discussed generally with respect to their use in the development and deployment of cloud applications. Now, alerts will be discussed in greater detail.

Cloud application developers can make changes to a cloud application profile while the cloud application profile is in DRAFT status. Auto-Audit services are a set of rules applied to every change made to a cloud application profile.

Alerts are generated for every Auto-Audit rule that fails. As stated previously alerts are classified as INFO, WARN, ERROR, and FATAL. Preferably, a developer will review the alerts associated with each cloud application profile change. Further, the appropriate approvers, cloud managers, must review the alerts when they are non-INFO alerts associated with a particular cloud application profile before the cloud application can be advanced to being provided live on the private cloud.

As a described previously, approvers can accept or decline the alerts after review. If the approver accepts the alerts the cloud application will move forward in the development and deployment process. However if the approver declines the alerts the cloud application moves backwards by setting the status of the cloud application profile to REJECTED with the reason code as DECLINED ALERTS. Alerts that are generated can be automatically sent to approvers by email or other messaging method so that they will be alerted to the generation of such alerts.

Generally, the Auto-Audit mechanism is for identifying issues and problems in a cloud application profile. This Auto-Audit mechanism includes rules that will generate auto alerts when any of the rules that are checked result in a failure. The Auto-Audit rules are created by the cloud manager.

Alerts are associated with issues and problems in the cloud application profile, and once generated must be accepted or declined by an appropriate level approver of the cloud manager. If the cloud manager accepts the alerts associated with a cloud application profile, then the cloud application will move forward in the process toward being displayed live in the private cloud. If the alert is declined, the cloud application is rejected and the cloud application profile status is changed to DRAFT. If this is the case, the developer must fix the problem before the application can be moved forward to being PUBLISHED.

Figure 23A:
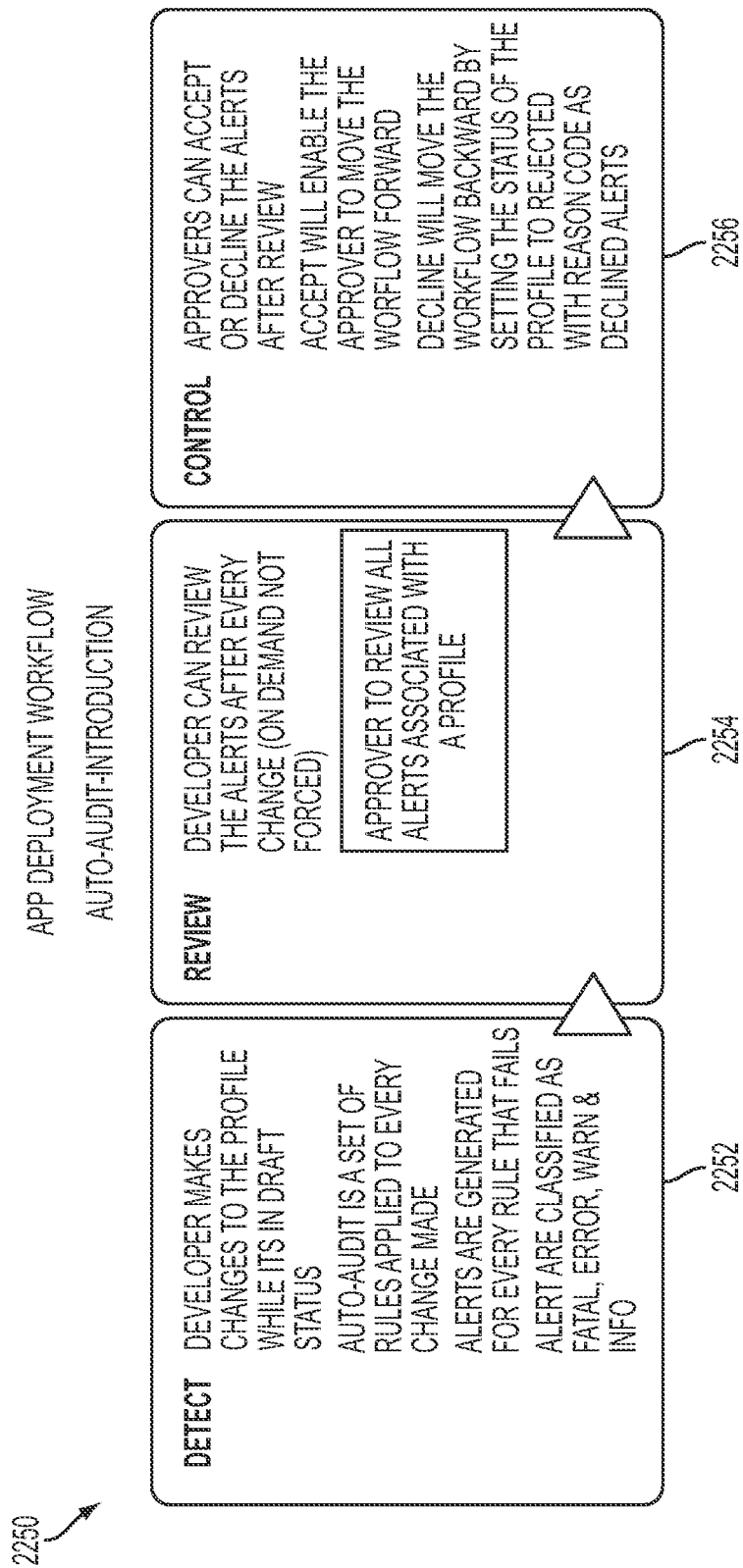
FIG. 23A shows a representative diagram relating to actions associated with the application of Auto-Audit rules.

Referring to FIG. 23A, generally at 2250, a representative diagram relating to actions associated with the application of Auto-Audit rules application is shown. At 2252, Auto-Audit rules are applied to a cloud application when the associated cloud application profile is changed while it is in the DRAFT status. In the "detect" phase, alerts are generated for every Auto-Audit rule that fails. As stated previously, the alerts are classified as INFO, WARN, ERROR, or FATAL.

In the "review" phase at 2254, developers will review the alerts after every change to a cloud application profile. An approver of the cloud manager reviews every alert. In the "control" phase, approvers of the cloud manager must accept or decline the alerts after review.

A representative set of Auto-audit rules is shown in FIG. 23B generally at 2300. Referring to FIG. 23B, a representative set of Auto-Audit rules is shown at 2302. There are 10 rules shown but this set of 10 is only exemplary. With respect to each rule, there is a severity of the rule that is shown at 2304. The severity is defined by one of the four alert states, namely, INFO, WARN, ERROR, and FATAL. At 2306, there is an explanation of the alert. Accordingly, when there is a change to any cloud application profile status, each of the Auto-Audit rules is checked and to the extent that there are any violations, alerts will be lodged against that cloud application. It is only upon the acceptance of these alerts by the appropriate approvers that the cloud application can move forward in the development and deployment process.

In FIG. 4, a user interface 402 shows dashboard 406. A representative dashboard display is shown in FIG. 24 generally at 2400. As shown, a cloud application and zones can be viewed in detail or graphically to enable a survey of a cloud application's health. In FIG. 24, for the cloud application shown at 2401, application details are shown at 2402, virtual machine details are shown at 2406, and virtual details are shown at 2408. Further, the graphical display of zones is shown at 2410.

The graphical display of zones at 2410 shows the health with regard to TX/SLO (Transaction/SLO) at 2412 and users at 2418 to be very good since the indicator arrow is well into the Green area. The health of physical machines shown at 2416 is not as good because the indicator arrow is close to the Yellow or warning area. Finally, the health of virtual machines shown at 2414 is not good because the indicator arrow is in the Red area. Preferably, because the indicator arrow is in the Red area, cloud managers will be alerted to this and, if possible, correct the loading problem associated with the virtual machines.

It is understood, that there may be the selection of the various tabs shown on dashboard display 2400 and this will provide additional health information with regard to the system applications and infrastructure.

Figure 25:
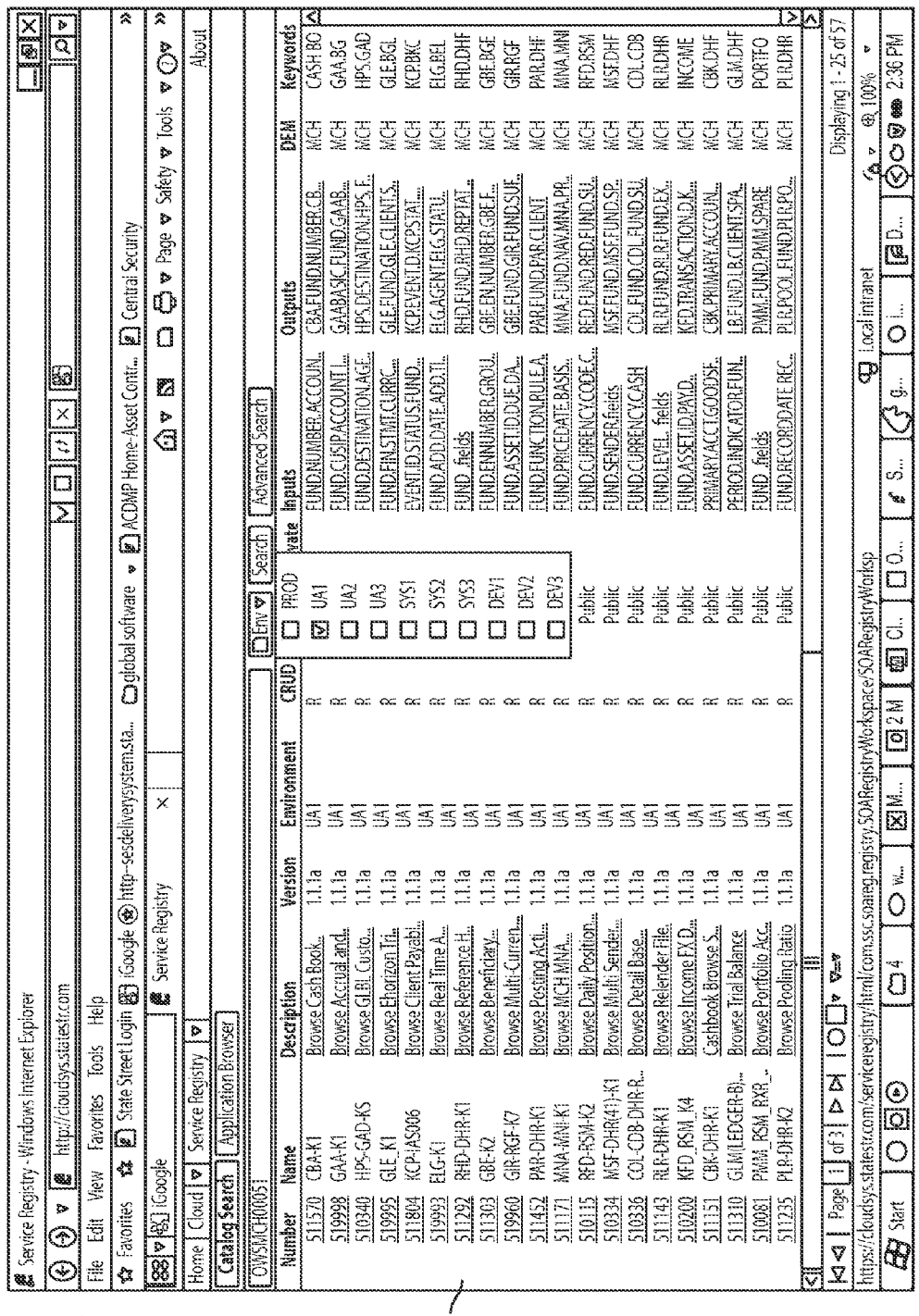
FIG. 25 shows a representative service registry display screen according to the computer-based private cloud system of the present invention.

In describing service registry 524 with respect to FIGS. 6 and 7, the content of the service registry was discussed but not shown. Further, there has been previous discussion that through the service registry authorized system users would have access to web services details related to service registry entries. In FIGS. 25 and 26, representative screen displays of a service registry window and a web services detail window are shown.

Referring to FIG. 25, generally at 2500, a representative service registry display window is shown. As shown at 2502, each registry entry has a number, name, description, and additional information relating to the service. This information makes the services searchable by authorized system users. If an authorized system user desires detailed information with regard to a specific entry in the service registry, it may be obtained by selecting that service entry which will open a web services detail window, such as the one shown in FIG. 26.

Referring to FIG. 26, generally at 2600, a service registry display 2602 with a web services detail display 2604 window is shown. If an authorized system user selects service registry no. 511446 in service registry window 2602, it will open web services detail display window 2604 for service registry no. 511446 to provide specific detail with regard to that registry number. In display window 2604 the basic information about service registry no. 511446 is shown; however, by selecting any of the additional tabs, additional detailed information will be provided about this registry number.

Referring to FIGS. 27-32, representative cloud application deployment workflows will be described.

Figure 27:
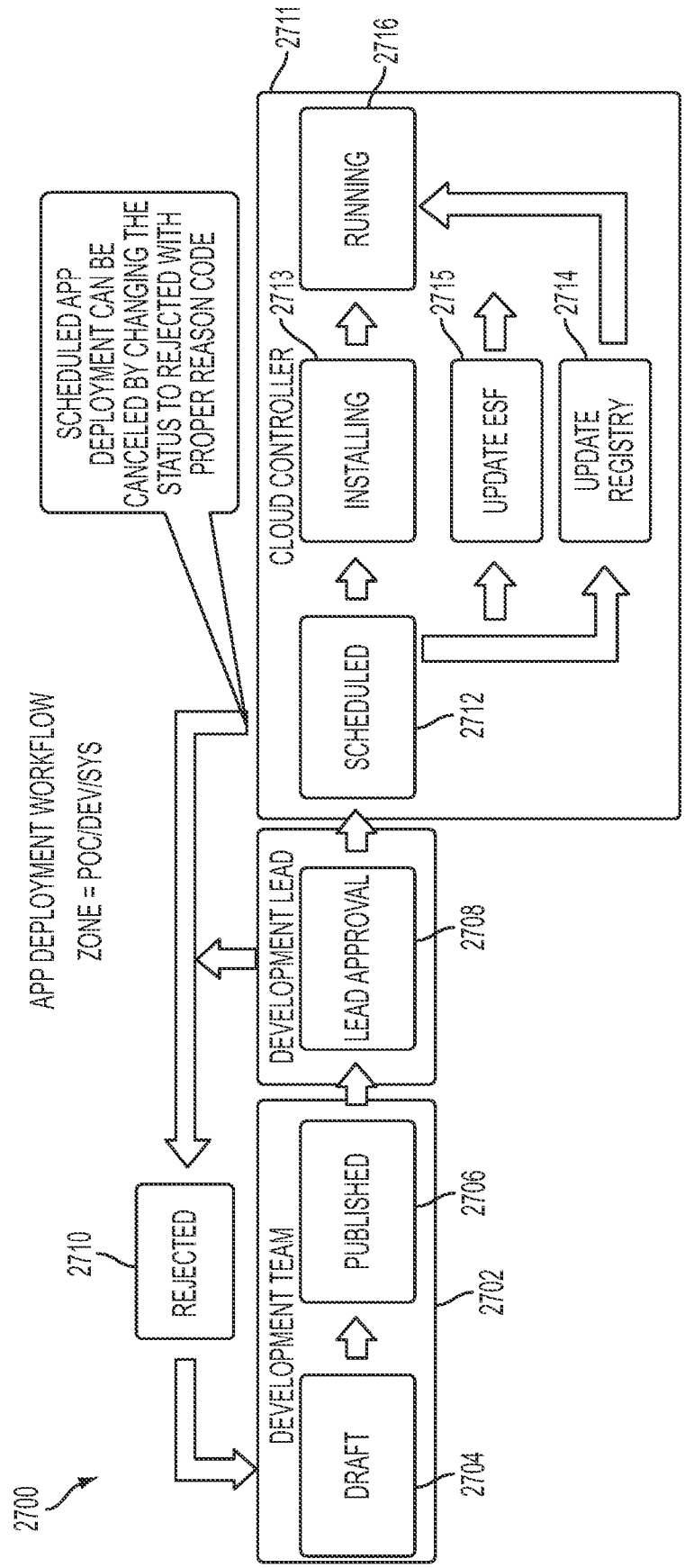
FIGS. 27-32 show representative drawings relating to cloud application deployment workflows.

Referring to FIG. 27, generally at 2700, a cloud application deployment workflow is shown for the POC/DEV/SYS environments. Collectively, POC/DEV/SYS form a zone. This Figure shows the process a cloud application profile must go through when a cloud application is being deployed to the POC, DEV, and SYS environments.

At 2702, a developer will have access to a cloud application profile to edit the fields of the profile file as long as it has the DRAFT status, as shown at 2704. Once the developer is satisfied with the changes to the cloud application profile, the status in the cloud application profile will be changed to PUBLISHED at 2706.

Next, preferably, a lead developer will review the application profile and when satisfied with it, he/she will change the status of the cloud application to LEAD APPROVAL, as shown at 2208. If, however, the lead developer is not satisfied, he/she can reject the application as shown as REJECTED at 2710, which will return the status of cloud application profile to DRAFT.

If the lead developer approves the cloud application, the cloud application profile will be forwarded to the Cloud Controller at 2711. The Cloud Controller, having taken over at this point, validates the cloud application profile and changes the status of the cloud application profile to SCHEDULED, as shown at 2712. The application profile will stay in the status until it is time for deployment to the private cloud.

Typically, the time to deploy a cloud application is indicated in the cloud application profile. When the deployment time comes, the Cloud Controller changes the status of the cloud application profile to INSTALLING at 2713, while at the same time carrying out provisioning to install the cloud application. The Cloud Controller will extract the service inventory file, read the service metadata and access control information, UPDATE eSF at 2715, and UPDATE SERVICE REGISTRY at 2714. Once installation is complete, the status of the cloud application profile is changed to RUNNING at 2716. Preferably, RUNNING means the cloud application is running live in the private cloud.

Figure 28:
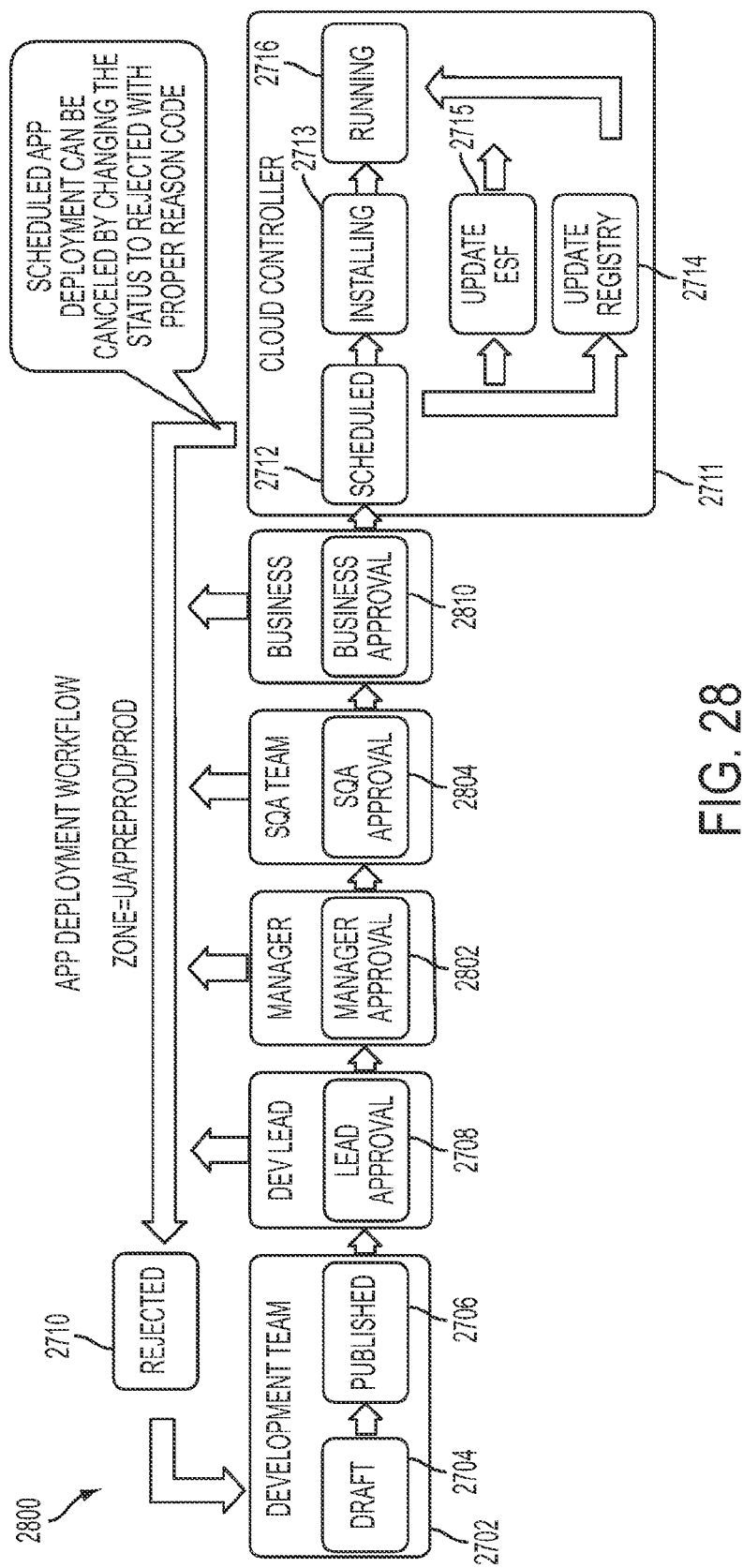

Referring to FIG. 28, generally at 2800, a cloud application deployment workflow is shown for POC/DEV/SYS environments. Collectively, UAT/PREPROD/PROD form a zone. In FIG. 28 the workflow processes that relate to DRAFT at 2704, PUBLISHED at 2706, LEAD APPROVAL at 2708, REJECTED at 2710, SCHEDULED at 2712, INSTALLING at 2713, UPDATE eSF at 2715, and UPDATE REGISTRY at 2714 are the same as those in FIG. 27. Accordingly, the descriptions of these items with respect to FIG. 27 apply equally here and are incorporated by reference.

When deploying the cloud application to the UAT and PROD environments, the workflow requires three additional approvals after the LEAD APPROVAL at 2708. These approvals include the MANAGER APPROVAL at 2802, SQA APPROVAL at 2804, and BUSINESS APPROVAL at 2810. There can be more or less than these additional approvals and it will still be within the scope of the present invention.

Figure 29:
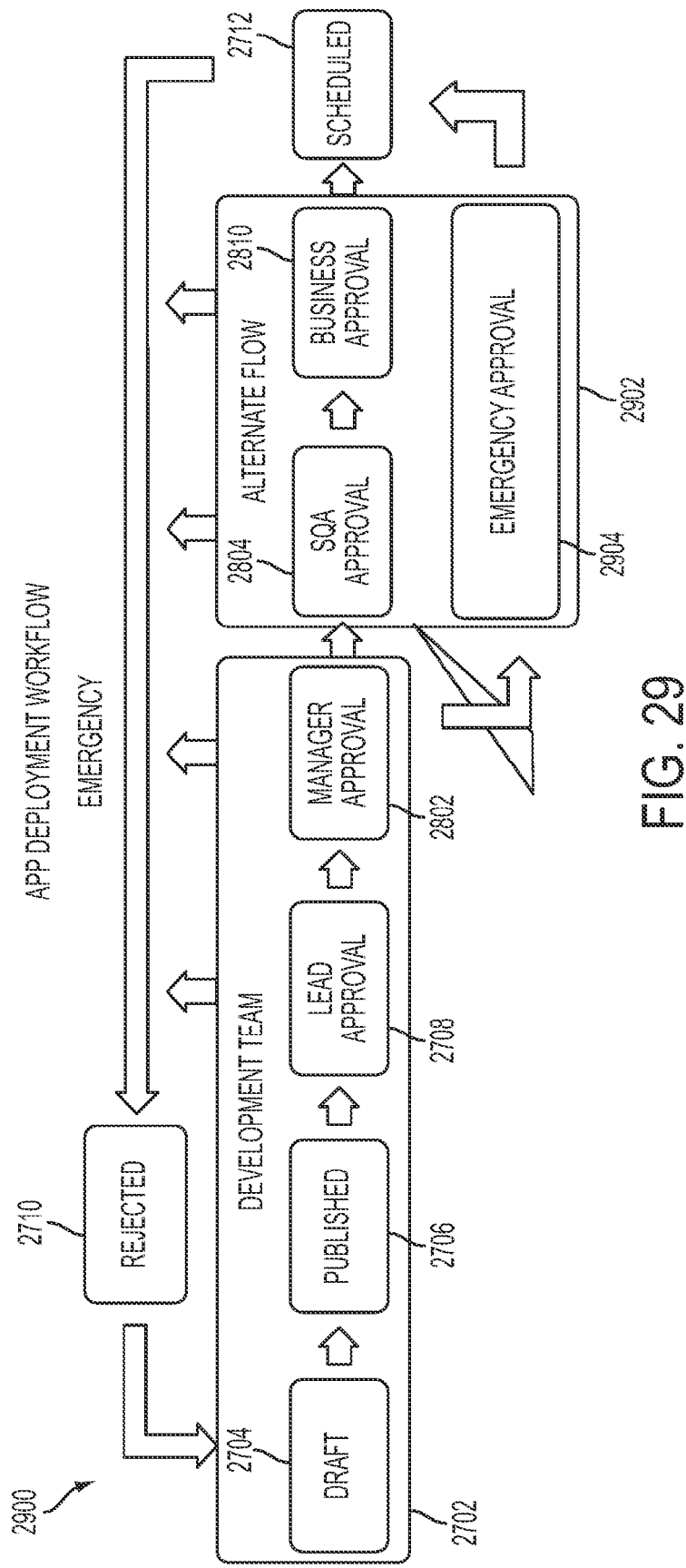

Referring to FIG. 29, generally at 2900, a cloud application deployment workflow is shown for emergency conditions. In FIG. 29, the workflow processes that relate to DRAFT at 2704, PUBLISHED at 2706, LEAD APPROVAL at 2708, REJECTED at 2710, MANAGER APPROVAL at 2802, SQA APPROVAL at 2804, BUSINESS APPROVAL at 2810, and SCHEDULED at 2712, are the same as those in FIG. 28, except LEAD APPROVAL at 2708 and MANAGER APPROVAL at 2802 are part of developer 2702, and SQA APPROVAL at 2804 and BUSINESS APPROVAL at 2810 are grouped in alternative flow 2902 that includes EMERGENCY APPROVAL 2904. Accordingly, the descriptions of these items with respect to FIG. 28 apply equally here and are incorporated by reference.

If the developer requests that the cloud application profile be moved as an emergency deployment, the workflow of FIG. 29 will be used. In the emergency deployment workflow, the SQA and BUSINESS APPROVAL may be skipped by an authorized person who has access to EMERGENCY APPROVAL at 2904. Preferably, the emergency workflow is for deploying unexpected but critical technical changes that need to be moved forward urgently to deployment.

Figure 30:
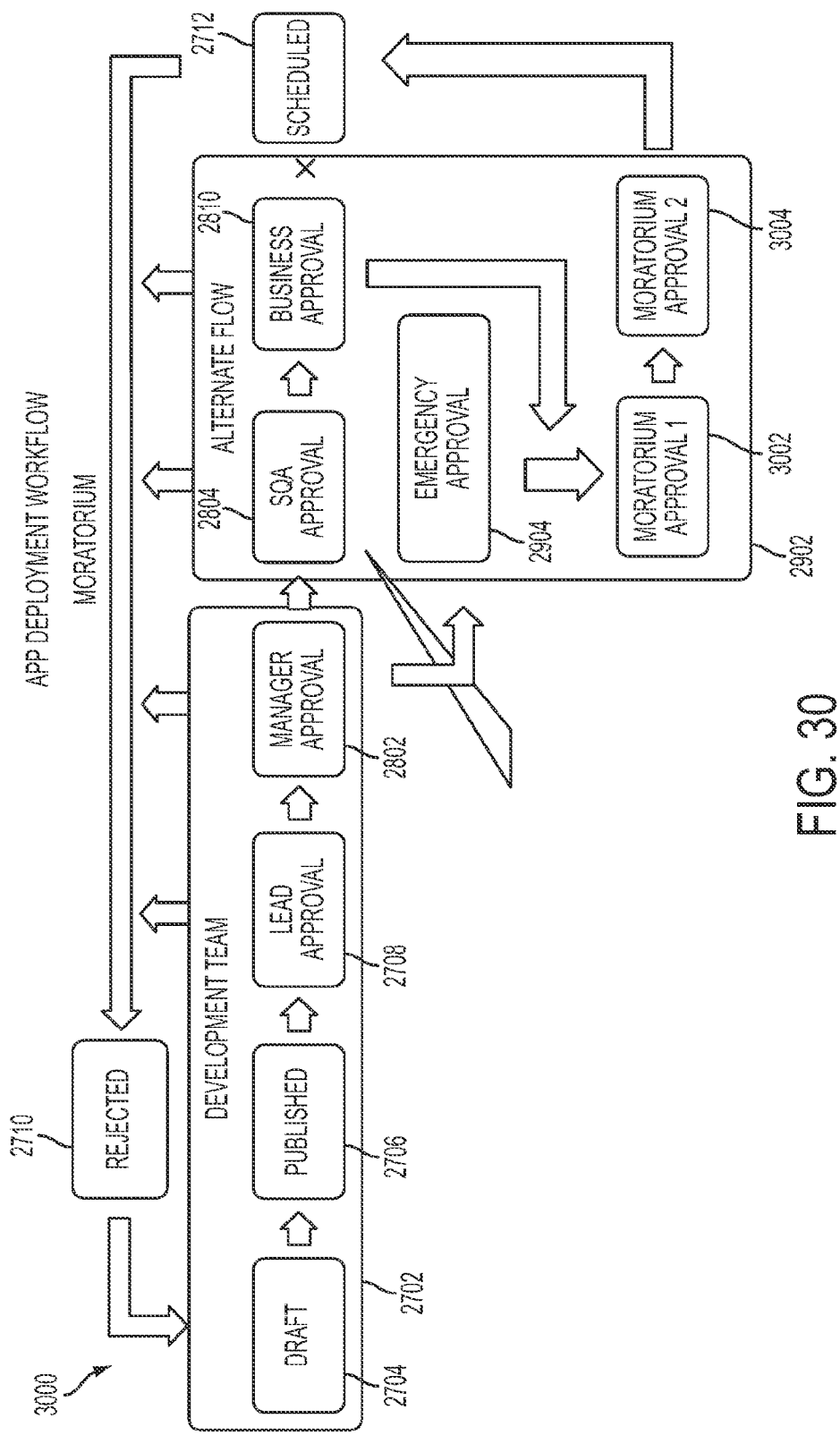

Referring to FIG. 30 generally at 3000, a moratorium cloud application deployment workflow is shown. In FIG. 29, the workflow processes that relate to DRAFT at 2704, PUBLISHED at 2706, LEAD APPROVAL at 2708, REJECTED at 2710, MANAGER APPROVAL at 2802, SQA APPROVAL at 2804, BUSINESS APPROVAL at 2810, SCHEDULED at 2712, and EMERGENCY APPROVAL at 2904 are the same as those in FIG. 29. Accordingly, the descriptions of these items with respect to FIG. 29 apply equally here and are incorporated by reference.

A moratorium deployment workflow is used when cloud applications need to be moved during a monthly moratorium or other fixed period of time. For example, it could coincide with the last and first business days of a month. During this time, changes to live cloud applications are restricted.

According to FIG. 30, alternative workflow 2902 includes MORATORIUM APPROVAL 1 at 3002 and MORATORIUM APPROVAL 2 at 3004. These latter approvals are acquired from high-level entities within the enterprise.

Figure 31:
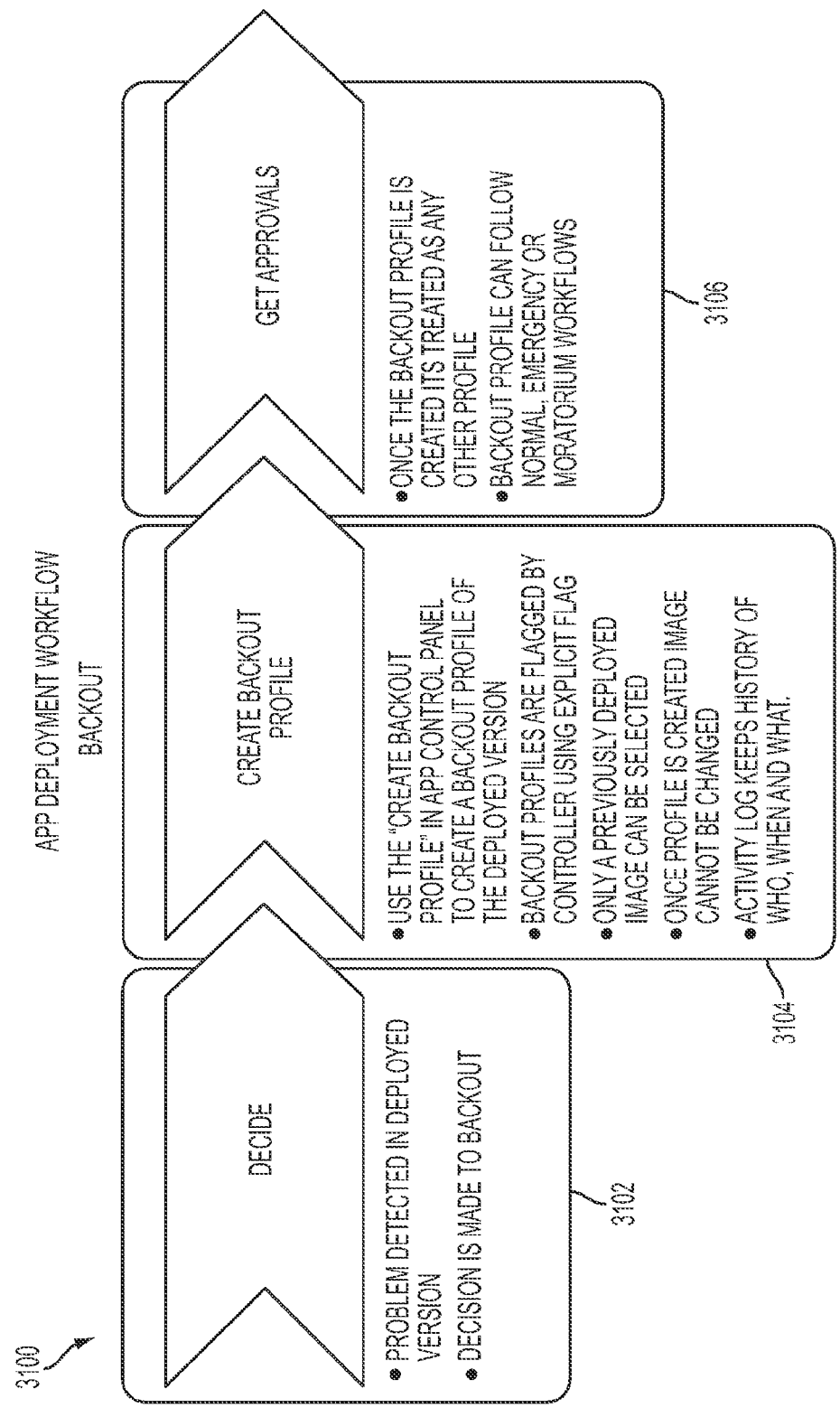

Referring to FIG. 31, generally at 3100, shows a cloud application deployment workflow for backing an application out of the deployment process. When a cloud application deployment results in an unexpected malfunction in the cloud application, it may be necessary for the version of the cloud application that was deployed to be backed out of the private cloud.

When a problem is detected in a deployed cloud application, a decision will be made whether to back the application out. This can be done by the creation of an application "backout" file. This file may be created with the binaries for the cloud application that were deployed before the cloud application had problems. A backout profile is created by the developer using these binaries.

Again referring to FIG. 31, the backout application deployment workflow is shown graphically. At 3102, once there is a problem detected with a deployed version of the cloud application, a decision must be made whether or not to create and use a backout profile.

If it is decided to create a backout profile, the process proceeds to 3104. At 3104, the backout profile can be created using the Application Control Panel. In creating the backout profile, only previously deployed cloud applications can be used. Further, once the backout profile is created it cannot be changed. An activity log keeps track of the history related to the backout profile.

Once the backout file is created, the process moves to 3106, where it is necessary to get the appropriate approvals. These approvals are obtained in a manner consistent with the workflows shown in at least FIGS. 27-30 and 32.

Figure 32:
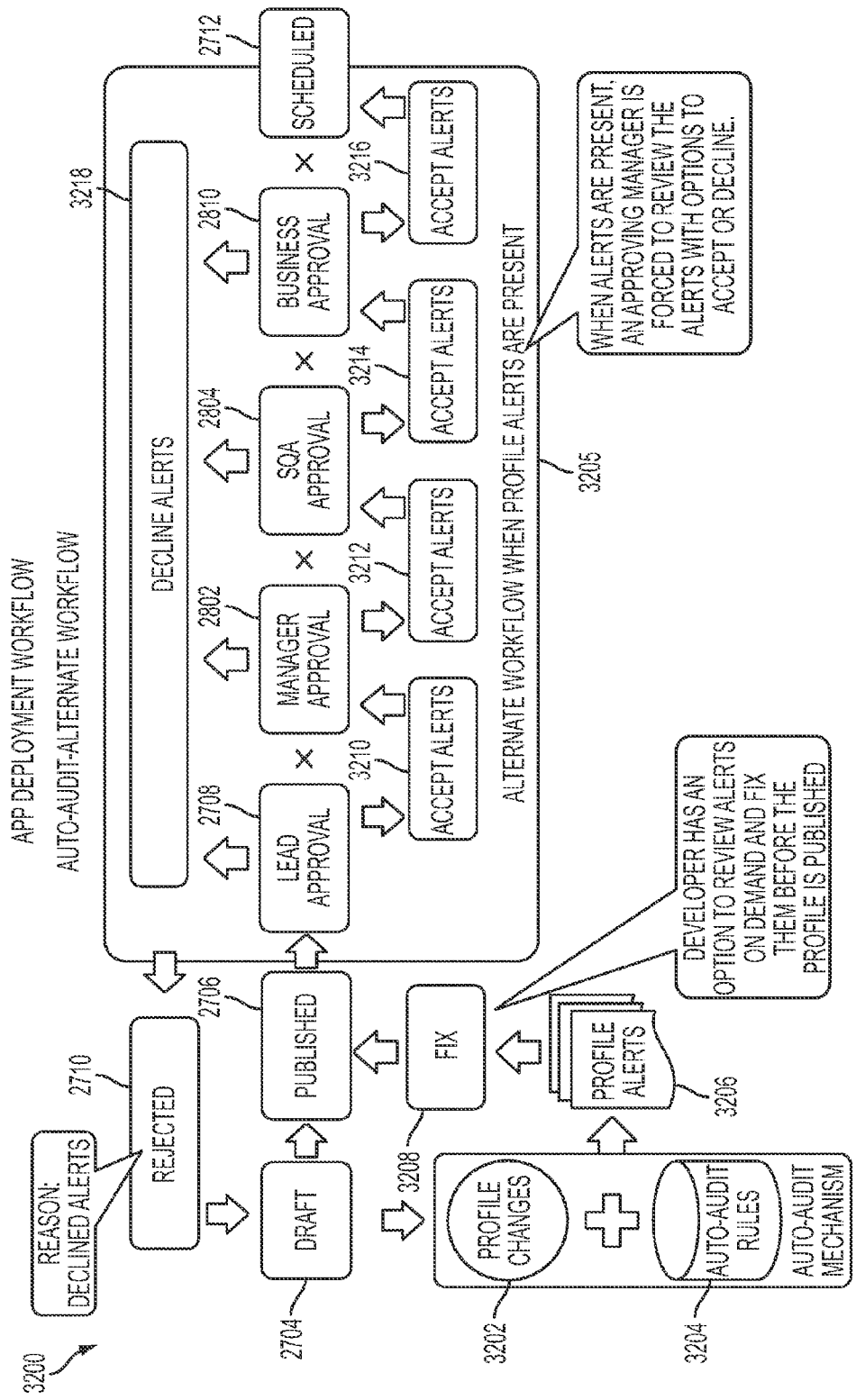

Referring to FIG. 32, generally at 3200, and alternative cloud application deployment workflow shown in which Auto-Alerts are incorporated. In FIG. 32, the workflow processes that relate to DRAFT at 2704, PUBLISHED at 2706, LEAD APPROVAL at 2708, REJECTED at 2710, MANAGER APPROVAL at 2802, SQA APPROVAL at 2804, BUSINESS APPROVAL at 2810, and SCHEDULED at 2712 are the same as those in FIG. 29. Accordingly, the descriptions of these items with respect to FIG. 29 apply equally here and are incorporated by reference.

The workflow shown in FIG. 32 incorporates the use of Auto-Audit rules at each stage. At 2704, a cloud application with a DRAFT status has its cloud application profile changed at 3202, then the Auto-Audit rules evaluate the change at 3204. This will generate application profile alerts at 3206. The developer then fixes the problems at 3208 that caused the alerts. If the fixes are deemed appropriate, then the cloud application is PUBLISHED at 2706. However, at each stage in the alternative workflow at 3205, each approval level must accept the alerts, as shown at 3010, 3012, 3014, and 3016, for the application to move to the next approval stage. If at any of the approved stages the alerts are declined, the workflow moves to decline alerts at 3218, and the application is rejected at 2710. When the application is rejected in this manner, its status will be reverted back to DRAFT and the process must begin again to move the cloud application to deployment in the private cloud.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-based system having a virtual machine infrastructure for hosting a plurality of virtual machine environments in a cloud computing environment, comprising:
   at least one system user interface electrically connected to the cloud computing environment, with the at least one system user interface initiating a virtual machine environment in the cloud computing environment by transmitting requests to the cloud computing environment to access and use applications and/or virtual machine services accessible through the cloud computing environment;
   at least one provisioner in the cloud computing environment that is electrically connected to the at least one system user interface, with the at least one provisioner for balancing a distribution of the requests for applications and/or virtual machine services from the at least one user interface among a plurality of activated first server types and a plurality of activated second server types in the cloud computing environment;
   at least one activated first server type electrically connected to the provisioner for at least routing requests received from the at least one system user interface for accessing and/or using virtual machine services stored in or accessible through the cloud computing environment;
   a plurality of second server types electrically connected to the at least one activated first server type, with the second server types for routing requests for applications and/or virtual machine services received from the at least one system user interface; and
   a cloud database electrically connected to the second server types and the at least one system user interface, with the cloud database receiving requests for access to virtual machine services in the cloud database and making the requested virtual machine services available for the at least one system user interface to run in a virtual machine environment in the cloud computing environment that is associated with the activated first-server type and one or more activated second server types.

2. The system as recited in claim 1, wherein the cloud computing environment includes a public cloud.

3. The system as recited in claim 2, wherein the at least one system user interface includes being wired or wirelessly connected to the cloud computing environment.

4. The system as recited in claim 1, wherein the cloud computing environment includes a private cloud.

5. The system as recited in claim 4, wherein the cloud computing environment includes an enterprise-wide private cloud.

6. The system as recited in claim 4, wherein the at least one system user interface includes being wired or wirelessly connected to the cloud computing environment.

7. The system as recited in claim 1, wherein the at least one system user interface includes a personal computer, personal digital assistant, tablet device, or smart phone.

8. The system as recited in claim 1, wherein the provisioner includes a load balancer for providing provisioning services for balancing the distribution of requests for applications and/or virtual machine services from the at least one system user interface among a plurality of first server types and second server types.

9. The system as recited in claim 8, wherein the plurality of first server types includes at least two web servers and the load balancer balances distribution of requests for applications and/or virtual machine services from the at least one system user interface between the two web servers.

10. The system as recited in claim 1, wherein the requests transmitted from the at least one system user interface to the cloud computing environment include requests formatted according to a hypertext transfer protocol (HTTP).

11. The system as recited in claim 1, wherein the first server type includes a web server.

12. The system as recited in claim 1, wherein the second server type includes an application server.

13. The system as recited in claim 1, wherein virtual machine services include virtual desktop services.

14. A computer-based system having a virtual machine infrastructure for hosting a plurality of virtual machine environments in a cloud computing environment, comprising:
   a plurality of system user interfaces electrically connected to the cloud computing environment, with each system user interface initiating a virtual machine environment in the cloud computing environment by transmitting requests to the cloud computing environment to access and use applications and/or virtual machine services accessible through the cloud computing environment;
   at least one provisioner in the cloud computing environment that is electrically connected to the plurality of system user interfaces, with the at least one provisioner for balancing a distribution of the requests for applications and/or virtual machine services from the plurality of user interfaces among a plurality of activated first server types and a plurality of activated second server types in the cloud computing environment;

a plurality of first server types electrically connected to the provisioner, with each activated first server type of the plurality of the first server types for at least routing requests for applications and/or virtual machine services received from the plurality system user interfaces for accessing and/or using applications and/or virtual machine services stored in or accessible through the cloud computing environment that have been provisioned by the provisioner to each activated first server type; and a plurality of second server types electrically connected to each first server type, with each activated second server type of the plurality of second server types for routing requests for applications and/or virtual machine services received from the plurality of system user interfaces to a plurality of hosted web services in each activated second server type and with the hosted web services being selected according to requests for applications and/or virtual machine services from each of the plurality of system user interfaces.

15. The system as recited in claim 14, wherein the cloud computing environment includes a public cloud.

16. The system as recited in claim 15, wherein each of the plurality of system user interfaces includes being wired or wirelessly connected to the cloud computing environment.

17. The system as recited in claim 14, wherein the cloud computing environment includes a private cloud.

18. The system as recited in claim 17, wherein the cloud computing environment includes an enterprise-wide private cloud.

19. The system as recited in claim 17, wherein each of the plurality system user interfaces includes being wired or wirelessly connected to the cloud computing environment.

20. The system as recited in claim 14, wherein each of the plurality of system user interfaces includes a personal computer, personal digital assistant, tablet device, or smart phone.

21. The system as recited in claim 14, wherein the provisioner includes a load balancer for providing provisioning services for balancing the distribution of requests for applications and/or virtual machine services from the plurality of system user interfaces among a plurality of first server types and second server types.

22. The system as recited in claim 21, wherein the plurality of first server types includes at least two web servers and the load balancer balances distribution of requests for applications and/or web services from the plurality of system user interfaces between the two web servers.

23. The system as recited in claim 14, wherein the requests transmitted from the plurality of system user interfaces to the cloud computing environment include requests formatted according to a hypertext transfer protocol (HTTP).

24. The system as recited in claim 14, wherein each of the plurality of first server types includes a web server.

25. The system as recited in claim 14, wherein each of the plurality of second server types includes an application server.

26. The system as recited in claim 14, wherein the system further includes a monitor for monitoring the number of requests the cloud computing environment receives from the plurality of system user interfaces for applications and/or virtual machine services for controlling a number of first server types and second server types that are activated and available to the provisioner for transmitting requests from the plurality of system user interfaces for applications and/or virtual machine services.

27. The system as recited in claim 14, wherein virtual machine services include virtual desktop services.

28. A computer-based system virtual machine infrastructure for provisioning a plurality of virtual machine environments in a cloud computing environment, comprising:

a provisioner in the cloud computing environment that receives a plurality of requests for desktop applications from a plurality of system user interfaces, with the provisioner for balancing a distribution of the requests for desktop applications from the plurality of user interfaces among a plurality of activated first server types and a plurality of activated second server types according to the number of requests received from the plurality of system user interfaces for operating one or more virtual machine environments in the cloud environment that are associated with activated first server types and activated second server types;

a cluster of a plurality of first server types connected to the provisioner, with each of the plurality of first server types of being capable of being activated and deactivated by the provisioner and when activated to process one or more requests for desktop applications from the plurality of system user interfaces according to the distribution of such requests by the provisioner and each activated first server type shall be associated with a virtual machine environment running in the cloud environment; and a cluster of a plurality of second server types connected to each of the plurality of first server types, with each of the plurality of second server types being capable of being activated and deactivated by the provisioner and when activated to process one or more requests for desktop applications from the plurality of system user interfaces according to the distribution of such requests by the provisioner and each activated second server type along with the connected activated first server type shall be associated with a virtual machine environment in the cloud environment.

29. The system as recited in claim 28, wherein the cloud computing environment includes a public cloud.

30. The system as recited in claim 29, wherein each of the plurality of system user interfaces includes being wired or wirelessly connected to the cloud computing environment.

31. The system as recited in claim 28, wherein the cloud computing environment includes a private cloud.

32. The system as recited in claim 31, wherein the cloud computing environment includes an enterprise-wide private cloud.

33. The system as recited in claim 31, wherein each of the plurality system user interfaces includes being wired or wirelessly connected to the cloud computing environment.

34. The system as recited in claim 28, wherein the provisioner includes a load balancer for providing provisioning services for the plurality first server types and the plurality second server types for balancing the distribution of requests for desktop applications from the plurality of system user interfaces among the plurality of first server types and second server types.

35. The system as recited in claim 28, wherein each of the plurality of first server types includes a web server.

36. The system as recited in claim 35, wherein the plurality of first server types includes at least two web servers and the load balancer balances distribution of requests for desktop applications from the plurality of system user interfaces between the two web servers.

37. The system as recited in claim 36, wherein the plurality of second server types includes a cluster of application servers, with a cluster of application servers being connected to each of the web servers.

38. The system as recited in claim 30, wherein the system further includes a monitor for monitoring the number of requests the cloud computing environment receives from the plurality of system user interfaces for desktop applications and for controlling a number of activated first server types and activated second server types that are available to the provisioner for transmitting requests from the plurality of system user interfaces for desktop applications.

39. A computer-based system having a virtual machine infrastructure for hosting a plurality of virtual machine environments in a cloud computing environment, comprising:
- a plurality of system user interfaces electrically connected to the cloud computing environment, with each system user interface initiating a virtual machine environment by transmitting requests to the cloud computing environment to access and use applications and/or virtual machine services in the cloud computing environment;
- provisioning services of a cloud controller electrically connected to the plurality of system user interfaces for receiving the requests for applications and/or virtual machine services from the plurality of system user interfaces and provisioning virtual machine environments and associated virtual machine environment controls in the cloud computing environment according to the number of requests received from the plurality of system user interfaces;
- a plurality of virtual machine environments and associated virtual machine environment controls that are activated and deactivated by the provisioning services, with each activated virtual machine environment and associated virtual machine environment controls running web server instances and application instances in the cloud computing environment according to the requests for applications and/or virtual machine services provisioned to each activated virtual machine environment and associated virtual machine environment controls by the provisioning services;
- monitoring services of the cloud controller electrically connected to the provisioning services for monitoring the number of requests for applications and/or virtual machine services received from the plurality of system user interfaces and controlling the provisioning services to activate or deactivate certain of the plurality of virtual machine environments and associated virtual machine environment controls according to the number of requests for applications and/or virtual machine services received from the plurality of system user interfaces; and
- a cloud database for storing virtual machine services that can be retrieved and/or run in activated virtual machine environments as controlled by associated virtual machine environment controls according to the requests for applications and/or virtual machine services received from the plurality of system user interfaces.

40. The system as recited in claim 39, wherein the cloud computing environment includes a public cloud.

41. The system as recited in claim 40, wherein each of the plurality of system user interfaces includes being wired or wirelessly connected to the cloud computing environment.

42. The system as recited in claim 39, wherein the cloud computing environment includes a private cloud.

43. The system as recited in claim 42, wherein the cloud computing environment includes an enterprise-wide private cloud.

44. The system as recited in claim 42, wherein each of the plurality system user interfaces includes being wired or wirelessly connected to the cloud computing environment.

45. The system as recited in claim 39, wherein the provisioning services include a load balancer for balancing the distribution of requests for applications and/or virtual machine services from the plurality of system user interfaces among the plurality of activated virtual machine environments and associated virtual machine environment controls.

46. The system as recited in claim 39, wherein virtual machine environment controls includes a hypervisor for controlling an associated virtual machine environment.

47. The system as recited in claim 39, wherein virtual machine services include virtual desktop services.

48. A computer-based method for operation of a virtual machine infrastructure for hosting a plurality of virtual machine environments in a cloud computing environment, comprising the steps of:
- (a) a plurality of system user interfaces transmitting requests for applications and/or web services to the cloud computing environment;
- (b) provisioning services of the cloud computing environment receiving the requests for applications and/or virtual machine services from the plurality of system user interfaces and activating or deactivating virtual machine environments and associated virtual machine environment controls according to the number of requests for applications and/or virtual machine services received from the plurality of system user interfaces;
- (c) activated virtual machine environments and associated virtual machine environment controls running web server instances and application instances according to the requests for applications and/or virtual machine services that have been provisioned to each activated virtual machine environment and associated virtual machine environment controls; and
- (d) monitoring services of the cloud computing environment monitoring the number of requests for applications and/or virtual machine services received from the plurality of system user interfaces at a given point in time and controlling the provisioning services to activate or deactivate one or more virtual machine environments and associated virtual machine environment controls according to the number of requests for applications and/or virtual machine services received from the plurality of system user interfaces.

49. The method according to claim 48, wherein virtual machine environment controls include a hypervisor for controlling an associated virtual machine environment.

50. The method as recited in claim 48, wherein the provisioning services include a load balancer for balancing the distribution of requests for applications and/or virtual machine services from the plurality of system user interfaces among the plurality of activated virtual machine environments and associated virtual machine environment controls.

51. The method as recited in claim 48, wherein virtual machine services include virtual desktop services.

* * * * *